US008942011B2

(12) United States Patent
Kato et al.

(10) Patent No.: US 8,942,011 B2

(45) Date of Patent: Jan. 27, 2015

(54) POWER SUPPLY APPARATUS AND IMAGE FORMING APPARATUS

(75) Inventors: Takahiro Kato, Tokyo (JP); Motonobu Hatakeyama, Tokyo (JP); Koji Umetsu, Fukushima (JP)

(73) Assignee: Oki Data Corporation, Tokyo (JP)

( * ) Notice: Subject to any disclaimer, the term of this patent is extended or adjusted under 35 U.S.C. 154(b) by 357 days.

(21) Appl. No.: 13/401,535

(22) Filed: Feb. 21, 2012

(65) Prior Publication Data

US 2012/0212980 A1 Aug. 23, 2012

(30) Foreign Application Priority Data

Feb. 22, 2011 (JP) ................................ 2011-035971

(51) Int. Cl.
*H02M 3/335* (2006.01)
*G03G 15/00* (2006.01)

(52) U.S. Cl.
CPC ................................ *G03G 15/5004* (2013.01)
USPC .................................... 363/21.12; 363/56.09

(58) Field of Classification Search
CPC ................................ H02M 1/36; H02M 3/335
USPC ............... 363/20, 21.01, 21.12–21.18, 56.01, 363/56.09–56.11, 95, 97, 131
See application file for complete search history.

(56) References Cited

U.S. PATENT DOCUMENTS

| | | | | |
|---|---|---|---|---|
| 6,327,161 | B1 * | 12/2001 | Chen | 363/21.12 |
| 6,768,655 | B1 * | 7/2004 | Yang et al. | 363/21.01 |
| 7,518,889 | B2 * | 4/2009 | Baurle et al. | 363/21.12 |
| 8,059,429 | B2 * | 11/2011 | Huynh | 363/18 |
| 2008/0101103 | A1 * | 5/2008 | Sato | 363/97 |
| 2010/0202161 | A1 * | 8/2010 | Sims et al. | 363/20 |
| 2012/0194131 | A1 * | 8/2012 | Osswald | 320/112 |

FOREIGN PATENT DOCUMENTS

JP H-10-027072 A 1/1998

* cited by examiner

*Primary Examiner* — Matthew Nguyen
(74) *Attorney, Agent, or Firm* — Rabin & Berdo, P.C.

(57) ABSTRACT

A power supply apparatus supplies regulated power to an external apparatus. A power switch is turned on to receive AC power and turned off not to receive the AC power. The AC power is rectified by a rectifying section and is switched by a switching section into switched DC power which is smoothed by a rectifying/smoothing section. Upon reception of an alarm signal, the power disconnecting section stops sending the switched DC power to the rectifying/smoothing section. If the AC switch is turned off and then back on again after stopping sending the switched DC power to the smoothing section, the power disconnecting section allows receiving of the AC power only a time after turn-off of the power switch. Upon reception of an auto-off signal indicative of an idle state of the external apparatus, an auto-off section does not send the switched DC power to the rectifying/smoothing section.

17 Claims, 18 Drawing Sheets

TIME REQUIRED FOR SWITCHING FET FROM LATCHED STATE TO RELEASED STATE AFTER AC SWITCH IS TURNED OFF

60 : VOLTAGE ON CAPACITOR 25a AFTER AC SWITCH IS TURNED OFF
61 : VOLTAGE ON CAPACITOR 25a BELOW WHICH FET IS SWITCHED FROM LATCHED STATE TO RELEASED STATE

TIME REQUIRED FOR SWITCHING FET FROM LATCHED STATE TO RELEASED STATE AFTER AC SWITCH IS TURNED OFF

80 : VOLTAGE ON CAPACITOR 23c AFTER AC SWITCH IS TURNED OFF
81 : VOLTAGE ON CAPACITOR 23c BELOW WHICH FET IS SWITCHED FROM LATCHED STATE TO RELEASED STATE

POWER SUPPLY APPARATUS AND IMAGE FORMING APPARATUS

BACKGROUND OF THE INVENTION

1. Field of the Invention

The present invention relates to a switching mode power supply apparatus and an image forming apparatus that incorporates the switching mode power supply apparatus.

2. Description of the Related Art

A conventional image forming apparatus incorporates a power supply apparatus and a printer apparatus that operates on the power supply apparatus. The power supply apparatus is configured to receive an AC power through a main switch and convert the AC power into DC power. When an abnormality occurs in the printer apparatus, the printer apparatus sends an alarm signal to the power supply apparatus.

Japanese Patent Publication No. H10-27072 discloses a technology in which when an abnormality occurs in the load of a power supply apparatus, the power supply apparatus is switched off.

Such a conventional image forming apparatus has an AUTO OFF function in which if the printer apparatus is idle for more than a predetermined period of time, the power supply apparatus is automatically switched off. This type of image forming apparatus suffers from the following drawbacks.

Upon occurrence of an abnormality, the printer apparatus sends an alarm signal to the power supply apparatus, which in turn is automatically switched off. The power switch is then shifted to "OFF." When the power switch is again shifted to "ON," the AC power is not supplied until a certain period of time elapses before the power supply apparatus is released from the latched state. This is true for an auto-off function if the auto-off function is added to the power supply apparatus. This is inconvenient.

One way of solving this drawback may be releasing the power supply apparatus from the latched state in a shorter time. However, a shorter releasing time is detrimental to safe operation of the power supply apparatus. Accordingly, a need exists in the art for a solution to the aforementioned drawbacks.

SUMMARY OF THE INVENTION

The present invention was made to solve the aforementioned drawbacks.

An object of the invention is to provide a power supply apparatus in which an auto-off signal is received from an external apparatus, the output power is shut off but becomes ready to be switched on again after auto-off process has been performed.

An object of the invention is to provide a power supply apparatus in which an alarm signal is received from an external apparatus, the output power is shut off but becomes ready to be switched on again only after a predetermined period of time has passed.

A power supply apparatus (20A, 20B) supplies regulated power to an external apparatus (50A). A power switch (21*a*) is turned on by a user to receive AC power and is turned off by the user not to receive the AC power. A rectifying section (24) rectifies the AC power to produce DC power. A switching section (30, 28, 26) switches the DC power to produce switched DC power. A rectifying and smoothing section (34, 35) smoothes the switched DC power. A power disconnecting section (25*a*, 25*b*, 25*c*, 71, 72) stop sending the switched DC power to the smoothing section (34, 35) if the power disconnecting section receives an alarm signal (ALM-P) indicative of occurrence of an abnormality in the external apparatus (50A). If the AC switch is turned off and then turned back on again by the user after stops sending the switched DC power to the smoothing section (34, 35) in response to the alarm signal (ALM-P), the power disconnecting section allows the power supply apparatus to receive the AC power only a period of time (25*a*, 25*b*, 25*c*) after power switch is turned off. An auto-off section stops sending the switched DC power to the succeeding stage if the auto-of section receives an auto-off signal (AUTO-OFF-P) indicative that the external apparatus is in an idle mode.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein.

DETAILED DESCRIPTION OF THE INVENTION

Figure 1:
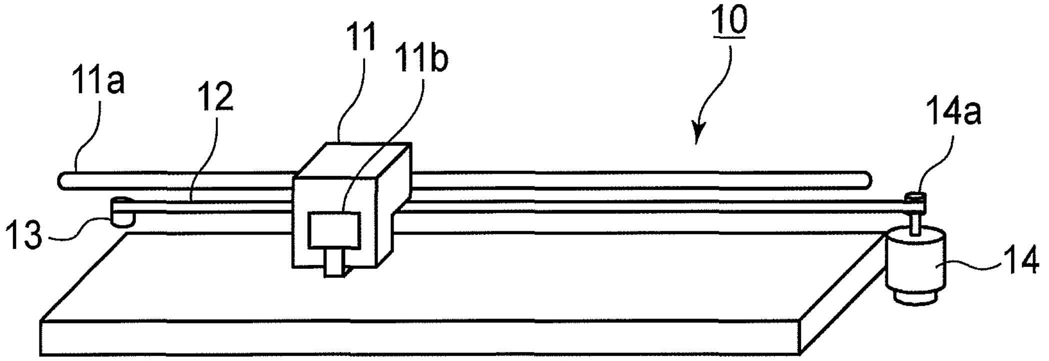
FIG. 1 is a perspective view illustrating the general configuration of a print engine according to the invention.

The present invention will be described by way of embodiments. Various structures, systems and devices are schematically depicted in the drawings for purposes of explanation only and are not to limit the present invention to preferred embodiments.

First Embodiment

An image forming apparatus according to a first embodiment incorporates a flyback switching mode power supply apparatus and a printer that operates on DC power supplied from the flyback switching mode power supply apparatus.

{Configuration of Printer}

FIG. 1 is a perspective view illustrating the general configuration of a print engine 10. The print engine 10 is a pertinent portion of a dot-impact serial printer, and includes a carriage unit 11. The carriage unit 11 incorporates a print head 11*b* used for printing on a sheet of print medium, e.g., paper. The carriage unit 11 is fixed to a belt 12 that is disposed horizontally about a pulley 13 and a gear 14*a* mounted on a space motor 14. The belt 12 has teeth in meshing engagement with the gear 14*a* and the pulley 13. The pulley 13 is free to rotate. When the space motor 14 is energized to rotate, the belt 12 is driven to run by the gear 14*a* so that the carriage unit 11 runs back and forth in the horizontal direction.

The print head 11*b* and space motor 14 are driven by drivers (not shown) in accordance with commands from a controller (not shown). The print head 11*b* operates in accordance with a print command to strike an ink ribbon (not shown) impregnated with ink, thereby printing on the sheet of print medium (not shown). The print engine 10 is capable of simultaneously printing on multiple sheets of paper.

{Power Supply Apparatus According to Comparative Example}

Figure 2:
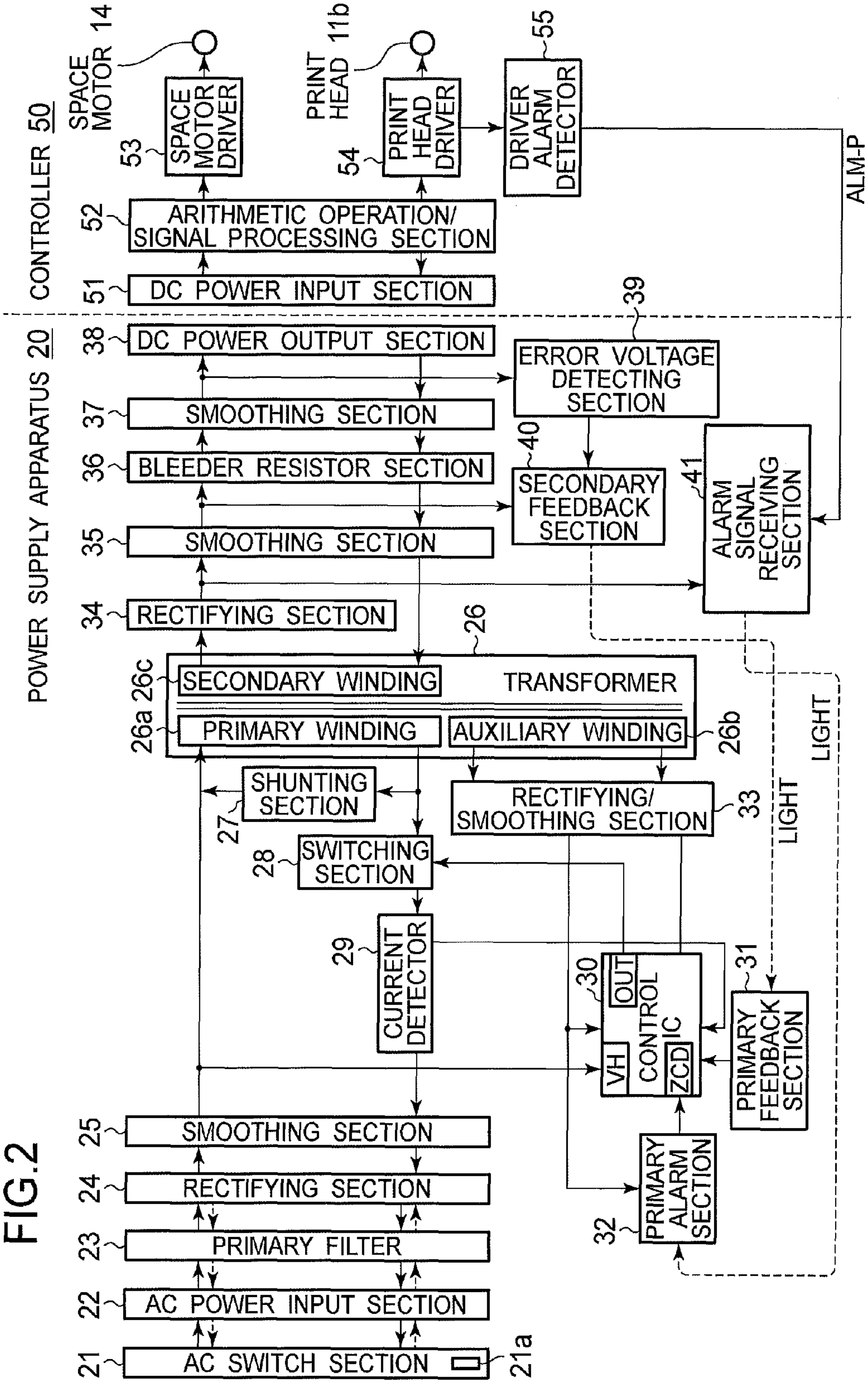
FIG. 2 is a block diagram illustrating a power supply apparatus as a comparative example.

FIG. 2 is a block diagram illustrating a power supply apparatus 20 as a comparative example.

The power supply apparatus 20 supplies DC power to a controller 50 that controls the operation of the space motor 14 and print head 11*b* of the print engine 10. The power supply apparatus 20 is built on, for example, a power supply circuit board (not shown).

The power supply apparatus 20 includes an AC switch section 21 with which an AC power input section 22, a primary filter 23 on the primary side of a transformer 26, a rectifier 24, and a smoothing section 25 are connected in cascade in this order.

The AC switch section 21 includes an AC switch 21*a* as a power switch, which is operated by the user to receive AC power or disconnect the AC power. The AC switch section 21 is connected to the AC input section 22 through a connector. The AC input section 22 includes the connector connected to the primary filter 23. The primary filter 23 removes noise on the primary side of the transformer 26. The rectifier 24 is a diode bridge which is an arrangement of four diodes in abridge circuit configuration, and full-wave rectifies the AC power, inputted through the primary filter 23, into DC power. The smoothing section 25 smoothes the rectified DC power, and feeds the smoothed DC power to the transformer 26.

The transformer 26 is a flyback transformer that includes a primary winding 26*a*, an auxiliary winding 26*b*, a secondary winding 26*c*. The primary winding 26*a* is connected to a shunting section 27, a switching section 28, a current detector 29, and a control IC 30. The control IC 30 is designed to control the switching operation of the switching regulator. The auxiliary winding 26*b* is used for supplying electric power to the control IC 30 and is connected to the control IC 30 through a rectifying/smoothing section 33. The control IC 30 is connected to a primary feedback section 31 and a primary alarm section 32 on the primary side of the transformer 26. A rectifying section 34, a smoothing section 35, a bleeder resistor section 36, a smoothing section 37, a DC power output section 38, an error voltage detecting section 39, a secondary feedback section 40 on the secondary side of the transformer 26, and an alarm signal receiving section 41 on the secondary side of the transformer 26 are connected in cascade in this order to the secondary winding 26*c* of the transformer 26.

The shunt section 27 is connected in parallel with the primary winding 26*a*. When the switching section 28 is switched off, the shunt section 27 forms a shunt path that shunts the back electromotive force developed across the primary winding 26*a*. The switching section 28 includes switching elements formed of, e.g., field effect transistor (FET) 28*a* (FIG. 3) that switches the current through the primary winding 26*a*. The current detecting section 29 is connected to the FET 28*a* in the switching section 28. The current detector 29 converts the detected current value into a corresponding voltage value, and the output of the current detector 29 is connected to the control IC 30. The rectifying/smoothing circuit 33 rectifies the output voltage of the auxiliary winding 26*b* into direct current, and smoothes the rectified direct current before the direct current is fed to the control IC 30.

The primary feedback section 31 operates in cooperation with the secondary feedback section 40. The primary alarm section 32 operates in cooperation with the alarm signal receiving section 41 on the secondary side of the transformer 26. The output of the primary alarm section 32 is fed to the control IC 30.

The control IC 30 compares the output voltage of the primary feedback section 31 with the output voltage of the current detector 29 to control the ON/OFF time of the switching section 28. The control IC 30 monitors the output voltage of the primary alarm section 32, so that when the output voltage exceeds a predetermined value which has been set in the control IC 30 in advance, the control IC 30 forcibly causes the switching operation of the switching section 28 to halt and to remain halted unless the output voltage of the smoothing section 25 decreases below the predetermined value.

The rectifying section 34 is connected to the secondary winding 26*c*, and rectifies the output power of the secondary winding 26*c*. The output of the rectifying section 34 is connected to the smoothing section 35 and alarm signal receiving section 41. The smoothing section 35 smoothes out the output of the rectifying section 34. The output of the smoothing section 35 is connected to the bleeder resistor section 36 and the secondary feedback section 40. An amount of current flows through the bleeder resistor section 36 at all times, so that the output voltage will not decrease when the power supply apparatus 20 has substantially no load. The smoothing section 37 is connected to the output of the bleeder resistor section 36, and smoothes the output of the smoothing section 35, thereby stabilizing the output voltage on the secondary side of the transformer 26. The DC power output section 38 and error voltage detecting section 39 are connected to the smoothing section 37.

The error voltage detecting section 39 produces an error voltage by dividing the output voltage of the power supply apparatus 20 from the smoothing section 37. The output of the error voltage detecting section 39 is fed to the secondary feedback section 40. The secondary feedback section 40 monitors the error voltage produced by the error voltage detecting section 39, and sends a signal to the primary feedback section 31 when the error voltage exceeds a reference voltage generated in the secondary feedback section 40. In response to the signal from the secondary feedback section 40, the primary feedback section 31 operates. The alarm signal receiving section 41 monitors the output voltage of the rectifying section 34, and operates if the output voltage of the rectifying section 34 exceeds a predetermined value or if the alarm signal receiving section 41 receives an alarm signal ALM-P from the controller 50. In response to the operation of the alarm signal receiving section 41, the primary alarm section 32 operates.

The DC power output section 38, which is connected to the output of the smoothing section 37, includes a connector through which DC output power of the power supply apparatus 20 is outputted to the controller 50.

The controller 50 controls the overall operation of the print engine 10, and is mounted on a control circuit board. The controller 50 includes a DC power input section 51, arithmetic operation/signal processing section 52, space motor driver 53, print head driver 54, and driver alarm detector 55.

The DC power input section 51 includes a connector (not shown) through which the DC power is supplied to the circuits in the controller 50 from the DC power output section 38. The arithmetic operation-signal processing section 52 performs a variety of control operations in the controller 50, and includes a central processing unit (CPU), large scale integrated circuits (LSIs), and other circuits. The space motor driver 53 outputs drive signals for driving the space motor 14 in rotation in accordance with the control signals from the controller 52. The print head driver 54 outputs drive signals for driving the print head 11*b* in accordance with the control signals from the controller 52. When the print head driver 54 malfunctions, the driver alarm detector 55 sends the alarm signal ALM-P to the alarm signal receiving section 41 in the power supply apparatus 20.

{Circuit Diagram of Comparative Example}

Figure 3:
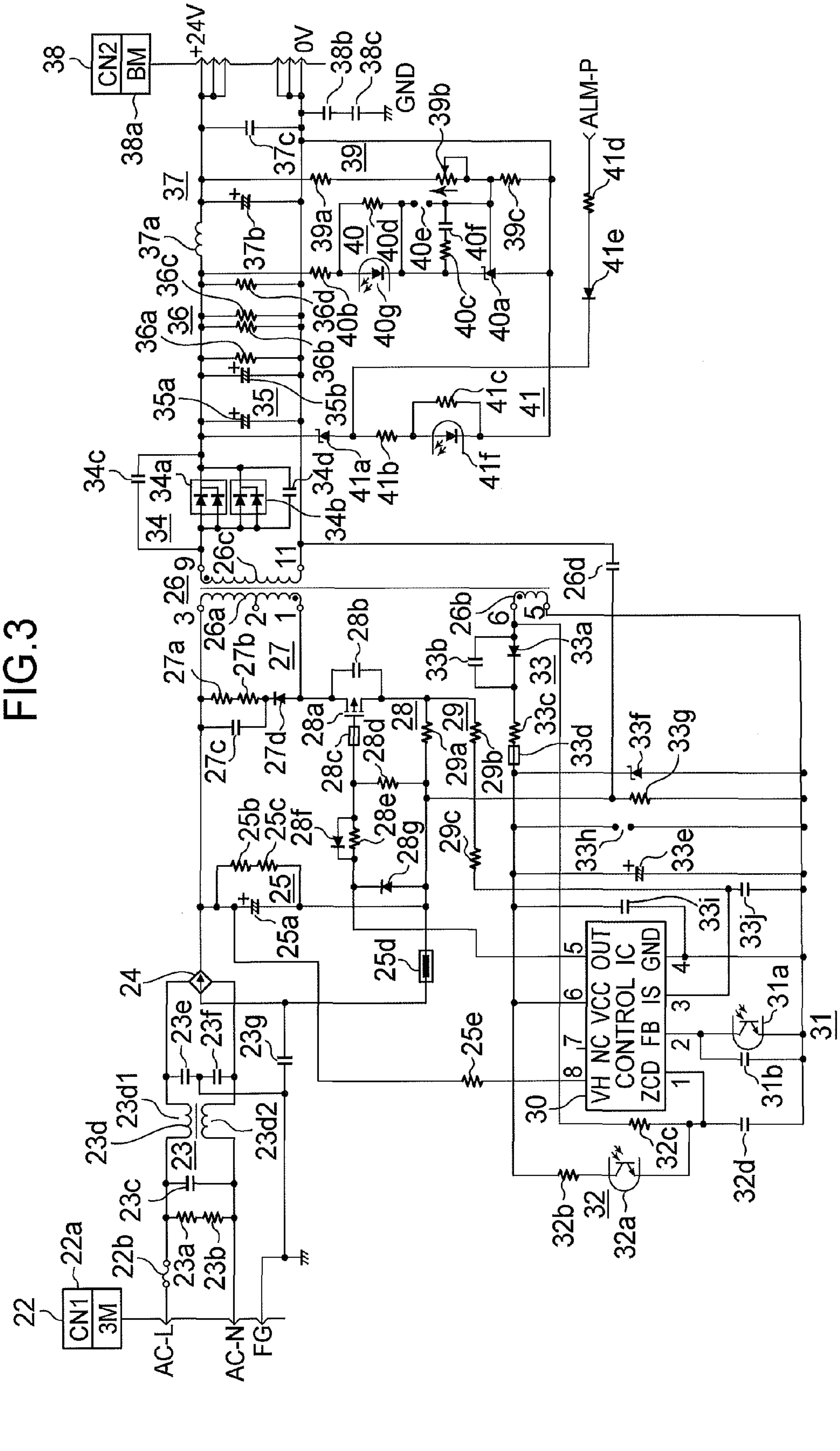
FIG. 3 is a schematic diagram of the power supply apparatus shown in FIG. 2.

FIG. 3 is a schematic diagram of the power supply apparatus 20 shown in FIG. 2. The AC input section 22 includes a connector 22*a* through which the AC power is received from the AC switch section 21. The connector 22*a* is connected to power lines AC-L and AC-N and a ground line FG. A fuse 22*b* is inserted in the power line AC-L, and protects the primary side from excessive primary side current. The primary filter 23 is connected across the AC line AC-N and one of the terminals of the fuse 22.

The primary filter 23 includes a capacitor 23*c* in parallel with a series circuit of resistors 23*a* and 23*b*, a choke coil 23*d*, a series circuit of capacitors 23*e* and 23*f*, and a capacitor 23*g*. The choke coil 23*d* includes a winding 23*d*1 connected between the resistor 23*a* and the capacitor 23*e*, and a winding 23*d*2 connected between the resistor 23*b* and the capacitor 23*f*. The junction of the capacitors 23*e* and 23*f* is connected to the ground line FG. The capacitor 23*g* is connected between the ground line FG and the rectifier 24. The resistors 23*a* and 23*b* form a discharge path through which the capacitor 23*c* discharges its charge. The output of the primary filter 23 is fed to the rectifier 24.

The rectifier 24 includes a diode for full-wave rectifying the AC power from the primary filter 23, and outputs the rectified AC power to the smoothing section 25. The smoothing section 25 includes a series of circuit of resistors 25*b* and 25*c* and an electrolytic capacitor 25*a* for smoothing the full-wave rectified AC power. The charge across the capacitor 25*a* is discharged through the series circuit of resistors 25*b* and 25*c*. A power thermistor 25*d* is inserted between the negative terminal of the capacitor 25*a* and another output terminal of the rectifier 24, and prevents rush current when the AC switch 21*a* is shifted to the ON position. The output of the smoothing section 25 is fed to the transformer 26.

The shunt section 27 is connected across the start end pin 1 and finish end pin 3. The start end pin 1 is connected to the switching section 28.

The shunt section 27 includes a series circuit of resistors 27*a* and 27*b* and a capacitor 27*c* in parallel with the series circuit of resistors 27*a* and 27*b*. This parallel circuit is in series with a shut diode 27*d*. The series circuit of the diode 27*d* and the parallel circuit is connected across the pin 1 and pin 3 of the primary winding 26*a*. The anode of the shunt diode 27*d* is connected to the start end P1 of the primary winding 26*a*. The switching section 28 includes the FET 28*a*, a parasitic capacitance 28*b* across the drain and cathode of the FET 28*a*, and a series circuit of a coil 28*c* and a resistor 28*d*. The FET 28*a* switches the current flowing through the primary winding 26*a*. When the FET 28*a* is turned off, a back electromotive force is developed across the primary winding 26*a*. The shunt section 27 shunts the back electromotive force.

A resistor 29*a* constitutes a part of the current detecting section 29 and is connected between the smoothing section 25 and the source of the FET 28*a*, i.e., between the resistor 28*d* and the source of the FET 28*a*. The junction of the coil 28*c* and resistor 28*d* is connected to the control IC 30 via a parallel circuit of the resistor 28*e* and diode 28*f*. A diode 28*g* is connected to the junction of the resistor 28*e* and power thermistor 25*d*. The source of the FET 28*a* is connected to the IS terminal P3 of the control IC 30 via a series circuit of the resistors 29*b* and 29*c*.

The start end pin 6 and finish end pin 5 of the auxiliary winding 26*b* of the transformer 26 are across the power supply terminal VCC P6 and ground terminal GND P4 of the control IC 30 via the rectifying/smoothing circuit 33. The rectifying/smoothing circuit 33 includes a diode 33*a* as a rectifier, a capacitor 33*b* in parallel with the diode 33*a*, a series circuit of a resistor 33*c* and a coil 33*d* connected to the cathode of the diode 33*a*, and an electrolytic capacitor 33*e* connected across the coil 33*d* and the finish end pin 5 of the auxiliary winding 26*b*. The output power of the auxiliary winding 26*b* is rectified by the diode 33*a* and is fed to the electrolytic capacitor 33*e* through the resistor 33*c* and coil 33*d*. The rectified power is smoothed by the electrolytic capacitor 33*e* before being supplied to the power supply terminal VCC P6 and ground terminal GND P4.

The electrolytic capacitor 33*e* is in parallel with the Zener diode 33*f* and terminals 33*h* for an external capacitor. The negative electrode of the electrolytic capacitor 33*e* is connected to the negative electrode of the electrolytic capacitor 25*a* through a resistor 33*g* having a resistance of substantially zero ohms. The coil 33*d* is connected to the control IC 30 through a capacitor 33*i*. The resistor 29*c* is connected to the finish end pin 5 of the auxiliary winding 26*b* through a capacitor 33*j*.

The control IC 30 is an element (e.g., available from Fuji Electric Semiconductors) that turns the FET 28*a* on and off. The control IC 30 includes a zero current detection signal input terminal (ZCD) P1, a feedback terminal (FB) P2, a current sense terminal (IS) P3, a ground terminal (GND) P4, an output terminal (OUT) P5, a power supply terminal (VCC) P6, a non-connected terminal (NC) P7, and a high voltage input terminal (VH) P8.

The ZCD terminal P1 is connected to the emitter of a photo transistor 32*a* of the primary alarm section 32. The photo transistor 32*a* receives the light emitted from a light emitting device 41*f* of the alarm signal receiving section 41. The photo transistor 32*a* and the light emitting device 41*f* constitute a photo-coupler. The ZCD terminal P1 is also connected to the junction of a resistor 32*c* and a capacitor 32*d*. The collector of the photo transistor 32*a* is connected to the start end pin 6 of the auxiliary winding 26*b* through the resistor 32*b*, coil 32*d*, resistor 33*c*, and the parallel circuit of the capacitor 33*b* and diode 33*a*. Another end of the resistor 33*c* is connected to the start end pin 6 of the auxiliary winding 26*b*. Another end of the capacitor 32*d* is connected to the finish end pin 5 of the auxiliary winding 26*b*. The photo transistor 32*a* is connected to the start end P to detect when the voltage at the start end pin 6 exceeds 7.2 V 2.3 μs after the FET 28*a* turns off, thereby protecting the regulator against overcurrent.

A photo transistor 31*a* has its collector connected to the FB terminal P2 and its emitter connected to the finish end pin 5 of the auxiliary winding 26*b*. The photo transistor 31*a* and a later described light emitting device 40*g* constitute a photo-coupler. A capacitor 31*b* is connected across the collector and emitter of the photo transistor 31*a*. The IS terminal P3 is connected to the source of the FET 28*a* through the series circuit of the resistor 29*c* and 29*b* and is also connected to the finish end pin 5 of the auxiliary winding 26*b* through a capacitor 33*j*. The GND terminal P4 is connected to the finish end pin 5 of the auxiliary winding 26*b* and is also connected to the start end P6 of the auxiliary winding 26*b* through the capacitor 33*i*, coil 33*d*, resistor 33*c* and the parallel circuit of the capacitor 33*b* and diode 33*a*.

The OUT terminal P5 is connected to the gate of the FET 28*a* through the resistor 28*e* and coil 28*c*. The VCC terminal P6 is connected to the start end pin 6 of the auxiliary winding 26*b* through the coil 33*d*, resistor 33*c*, and diode 33*a*. The VH terminal P8 is connected to the positive electrode of the electrolytic capacitor 25*a* through the resistor 25*e*.

The control IC 30 performs the following functions. When the photo transistor 32*a* of the primary alarm section 32 turns on, the voltage applied to the ZCD terminal P1 increases above a predetermined latch threshold voltage set in the control IC 30 below which the FET 28*a* stops its switching operation and remains turned off, thereby forcibly causing the switching operation of the FET 28*a* to stop and holding the FET 28*a* in the off state. Conversely, the control IC 30 switches the FET 28*a* from the latched state to the released state if the voltage on the VH terminal P8 decreases below a predetermined release threshold voltage below which the FET 28*a* is switched from the latched state to the released state. The control IC 30 compares the voltage on the FB terminal P2 connected to the photo transistor 31*a* with the voltage across the resistor 29*a* through which the current of the FET 28*a* flows, thereby adjusting the ON time during which the FET 28*a* is turned on.

The secondary winding 26*c* of the transformer 26 has a start end pin 9 and a finish end pin 11. The finish end pin 11 is connected to one end of the resistor 33*g* through a capacitor 26*d*. The start end P9 is connected to the rectifying section 34. The rectifying section 34 rectifies the output power of the secondary winding 26*c*. The rectifying section 34 includes parallel diodes 34*a* and 34*b*, capacitors 34*c* and 34*d* in parallel with the diodes 34*a* and 34*b*. The smoothing section 35, bleeder resistor section 36, smoothing section 37, and DC power output section 38 are connected in cascade with the rectifying section 34.

The smoothing section 35 smoothes out the current rectified by the rectifying section 34, and includes electrolytic capacitors 35*a* and 35*b* connected across the cathodes of the diodes 34*a* and 35*b* and the finish end pin 11 of the secondary winding 26*c*. The bleeder resistor section 36 includes resistors 36*a*, 36*b*, 36*c*, and 36*d*, and prevents the output voltage of the power supply apparatus 20 from decreasing when the load on the power supply apparatus 20 is not heavy. The smoothing section 37 smoothes out the output voltage of the power supply apparatus 20, and includes a coil 37*a*, an electrolytic capacitor 37*b*, and a capacitor 37*c*. The DC power output section 38 includes an output connector 38*a* through which the smoothed output voltage (e.g., 24 VDC) of the power supply apparatus 20 is outputted to the controller 50 shown in FIG. 2. The electrode of 0 volts side of the output connector 38*a* is connected to the ground GND through a series circuit of capacitors 38*b* and 38*c*.

The output of the smoothing section 37 is connected to the error voltage detecting section 39 and a secondary feedback section 40. The output of the rectifying section 34 is connected to the alarm signal receiving section 41.

The error voltage detecting section 39 divides the DC output voltage of the smoothing section 37 to produce an error detection voltage, and sends the error detection voltage to the secondary feedback section 40. The error voltage detecting section 39 includes a resistor 39*a*, a variable resistor 39*b*, and the resistor 39*c* which are used to divide the voltage output. The series circuit of the resistor 39*a*, a variable resistor 39*b*, and the resistor 39*c* is connected across the electrolytic capacitor 37*b*.

The secondary feedback section 40 includes a shunt regulator 40*a*, resistors 40*b*, 40*c*, and 40*d*, terminals 40*e* for connecting an external capacitor, a capacitor 40*f*, and a light emitting device 40*g*.

The error voltage outputted from the error voltage detecting section 39 is fed to the reference electrode of the shunt regulator 40*a*. The shunt regulator 40*a* has its anode connected to the negative electrode of the electrolytic capacitor 37*b*, and its cathode connected to the cathode of the light emitting device 40*g*. The anode of the light emitting device 40*g* is connected to the input terminal of the coil 37*a* through the resistor 40*b*. The resistor 40*d* is in parallel with the light emitting device 40*g*. The terminals 40*e* for the external capacitor are connected between the cathode of the light emitting device 40*g* and reference terminal of shunt regulator 40*a*. A series circuit of the resistor 40*c* and capacitor 40*f* is connected across the reference electrode of the shunt regulator 40*a* and the cathode of the shunt regulator 40*a*. The resistor 39*c* is connected between the reference electrode and the anode of the shunt regulator 40*a*.

When the voltage on the electrolytic capacitor 37*b* increases so that the voltage across the resistor 39*c* increases above a predetermined reference voltage set in the shunt regulator 40*a*, the shunt regulator 40*a* conducts through the anode and cathode electrodes. Thus, current flows through the light emitting device 40*g*, causing the light emitting device 40*g* to emit light. Conversely, if the output voltage on the electrolytic capacitor 37*b* decreases so that the voltage across the resistor 39*c* decreases below the predetermined reference voltage, the anode and cathode of the shunt regulator 40*a* do not conduct. Thus, the light emitting device 40*g* does not emit light.

The alarm signal receiving section 41 includes a Zener diode 41*a*, resistors 41*b*, 41*c*, and 41*d*, diode 41*e*, and light emitting device 41*f*. The Zener diode 41*a* has its cathode connected to the positive electrode of the electrolytic capacitor 35*a* and its anode connected to the negative electrode of the electrolytic capacitor 37*b* via the resistor 41*b* and a parallel circuit of light emitting device 41*f* and the resistor 41*c*.

The resistor 41*c* is connected across the anode and cathode of the light emitting device 41*f*. The alarm signal ALM-P indicates an abnormality that occurs in the controller 50, i.e., the load on the power supply apparatus 20, and is fed to the anode of the zener diode 41*a* through a series circuit of the resistor 41*d* and diode 41*e*.

When the output voltage on the electrolytic capacitor 35*a* increases above the Zener voltage of the Zener diode 41*a*, or when the alarm signal ALM-P is fed to the anode of the Zener diode 41*a* through the series circuit of the resistor 41*d* and diode 41*e*, the light emitting device 41*f* emits light.

{Operation of Comparative Example}

The operation of the image forming apparatus shown in FIGS. 1, 2, and 3 will be described.

The AC power is supplied through the AC switch section 21 to the AC input section 22. The input AC power passes through the primary filter 23, which removes noise from the AC power, to the rectifier 24. The input AC power is full-wave rectified by the rectifier 24, and is then smoothed by the smoothing section 25 into DC voltage. The smoothed DC voltage is switched on and off by the switching section 28 under the pulse width modulation (PWM) control of the control IC 30, and is supplied into the primary winding 26*a* of the transformer 26. AC voltage appears across the secondary winding 26*c*, being proportional to the ratio of the number of turns of the primary winding 26*a* to that of the secondary winding 26*c*. The AC voltage across the secondary winding 26*c* is rectified by the rectifying section 34, and is then smoothed by the smoothing section 35 into DC voltage. The smoothed DC voltage is fed to the smoothing section 37 past the bleeder resistor section 36. The smoothing section 37 further smoothes the DC voltage and outputs the smoothed DC voltage to the DC power output section 38.

The DC voltage outputted from the DC power output section 38 is then fed to the DC power input section 51 in the controller 50. The arithmetic operation/processing section of the controller 50 performs the arithmetic operation and signal processing, thereby producing control signals for driving the print engine 10 (FIG. 1). The control signals are fed to the space motor driver 53 and print head driver 54. The driver space motor 53 drives the space motor 14 in the print engine 10 and the print head driver 54 drives the print head 11*b*, thereby printing on the sheet of print medium (not shown).

The current flowing through the FET 28*a* is converted into a voltage across the resistor 29*a*. The voltage across the resistor 29*c* is applied to the IS terminal P3 of the controller IC 30 through the resistors 29*b* and 29*c*.

When the DC voltage outputted from the smoothing section 37 increases so that the voltage across the resistor 39*c* increases above the predetermined reference voltage set in the shunt regulator 40*a*, the light emitting device 40*g* emits light. In response to the light, the photo transistor 31*a* turns on, causing the voltage on the FB terminal P2 of the control IC 30 to decrease. When the load on the regulator 20A is not heavy, the photo transistor 31*a* operates in its linear region so that the voltage on FB terminal P2 is an analog voltage moving back and forth about a slice level of about 0.4 V. When the load is heavy, the photo transistor 31*a* operates as a switch so that the voltage on FB terminal P2 has a burst waveform having a repetition rate in a range of 0.3 to 120 kHz.

The control IC 30 compares the voltage on the FB terminal P2 with the voltage on the IS terminal P3, and performs the PWM control based on the comparison results to output a switching signal having a variable duty from the OUT terminal P5 so that the ON time of the FET 28*a* becomes shorter. The switching signal is applied to the gate of the FET 28*a* through the resistor 28*e* and coil 28*c*, thereby setting a shorter ON time of the FET 28*a*. This decreases the DC voltage from the smoothing section 37.

When the DC voltage outputted from the smoothing section 37 decreases so that the voltage across the resistor 39*c* decreases below the predetermined reference voltage set in the shunt regulator 40*a*, the light emitting device 40*g* does not emit light. As a result, the photo transistor 31*a* turns off, causing the voltage on the FB terminal P2 of the control IC 30 to increase. The control IC 30 outputs the switching signal, which sets a longer ON time of the FET 28*a*, from the OUT terminal P5. This increases the DC output voltage outputted from the smoothing section 37, thereby minimizing the fluctuation of the DC output voltage.

{Alarm Signal Process}

Figure 4:
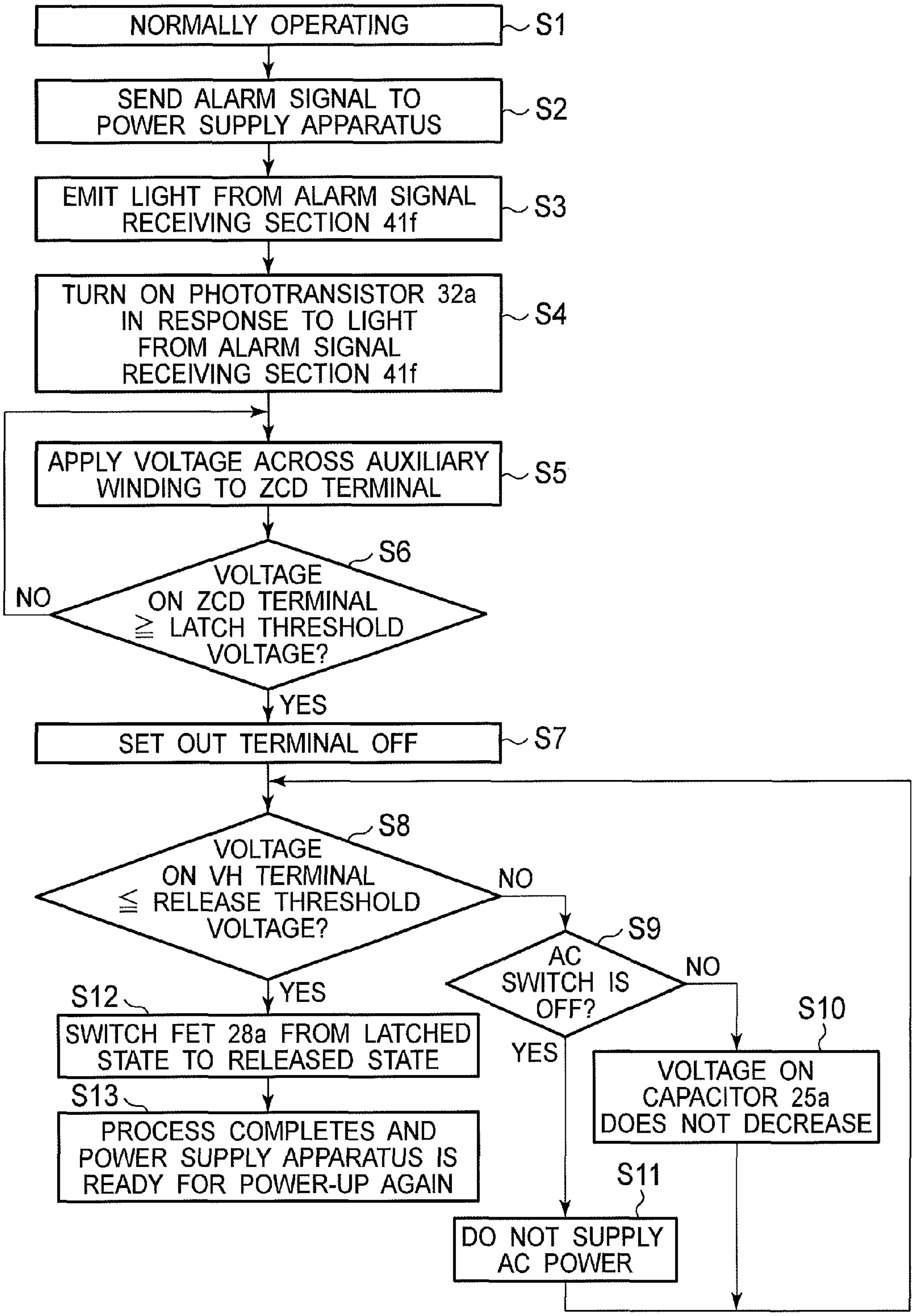
FIG. 4 is a flowchart illustrating the operation of the comparative example in the alarm signals process.

FIG. 4 is a flowchart illustrating the operation for an alarm signal process shown in FIGS. 2 and 3.

S1: The power supply apparatus 20 is normally operating.

S2: The driver alarm detector 55 sends the alarm signal ALM-P to the power supply apparatus 20 if the space motor driver 53 and/or the print head driver 54 fails.

S3: Upon reception of the alarm signal ALM-P, the light emitting device 41*f* of the alarm signal receiving section 41 emits light.

S4: In response to the light emitted from the light emitting device 41*f*, the photo transistor 32*a* turns on.

S5: The voltage across the auxiliary winding 26*b* is applied to the ZCD terminal P1 of the control IC 30 through the diode 33*a*, resistor 33*c*, coil 33*d*, resistor 32*b*, and photo transistor 32*a*.

S6: The control IC 30 compares the voltage on the ZCD terminal P1 with the latch threshold voltage which is preset in the control IC 30.

If the voltage on the ZCD terminal P1≥the latch threshold voltage (YES at S6), the program proceeds to S7 where the control IC 30 turns off the OUT terminal P5. The OFF state of the OUT terminal P5 is fed to the gate of the FET 28*a* through the resistor 28*e* and coil 28*c*, causing the FET 28*a* to stop its switching operation and hold the FET 28*a* in the OFF state. If the voltage on the ZCD terminal P1<the latch threshold (NO at S6), the program jumps back to S5 where the control IC 30 allows the FET 28*a* to perform its switching operation until the voltage on the ZCD terminal P1 increases so that the voltage on the ZCD≥the latch threshold voltage.

S8: The control IC 30 compares the voltage on the VH terminal P8 (i.e., voltage on the positive electrode of the electrolytic 25*a*) with the release threshold voltage. This reference voltage is predetermined in the control IC 30. If the voltage on the VH terminal P8>the release threshold voltage (NO at S8), the program proceeds to S9. If the voltage on the VH terminal P8≤the release threshold voltage, the program proceeds to S12.

S9: If the AC switch 21*a* is not in the OFF position (NO at S9), the program proceeds to S10. If the AC switch 21*a* is in the OFF state (YES at S9), the program proceeds to S11.

S10: Since the electrolytic capacitor 25*a* continues to be charged, the voltage on the capacitor 25*a* does not decrease. Therefore, the FET 28*a* continues to be latched unless the AC switch 21*a* is not shifted to the OFF position. The program then returns to S8.

S11: Since the AC switch 21*a* is in the OFF state, the AC power is not supplied to the power supply apparatus 20. Therefore, the electrolytic capacitor 25*a* will no longer be charged, so that the charge on the electrolytic capacitor 25*a* begins to discharge through the resistors 25*b* and 25*c*. The charge on the electrolytic capacitor 25*a* decreases in accordance with the time constant given by the electrolytic capacitor 25*a* and resistors 25*b* and 25*c*. The program then returns to S8.

S8: The control IC 30 compares the voltage on the VH terminal P8 with the release threshold voltage. If the voltage on the VH terminal≤the release threshold voltage (YES at S8), the program proceeds to S12 where the control IC 30 switches the FET 28*a* from the latched state to the released state. Therefore, at S13, the process completes and the power supply apparatus is ready for being switched on again.

{Switching FET from Released State to Latched State}

When the controller 50 sends the alarm signal ALM-P to the power supply apparatus 20, the switching operation of FET 28*a* is latched. The effects will be described below.

If the controller 50 is in an abnormal state, the controller 50 sends the alarm signal ALM-P to the power supply apparatus 20, thereby causing the FET 28*a* to stop its switching operation so that the power output of the power supply apparatus 20 is shut off (i.e., electric power is no longer supplied to the image forming apparatus). If the AC switch 21*a* remains in the ON position, the switching operation of the FET 28*a* remains latched. When the AC switch 21*a* is switched off, the switching operation of the FET 28*a* is maintained in the latched state at least for several minutes, until the voltage on the positive electrode of the electrolytic capacitor 25*a* decreases below the release threshold voltage. The AC switch 21*a* should then be shifted again to the ON position, thereby inputting the AC power again.

This is because the latched state is maintained for several minutes before the voltage on the positive electrode of the capacitor 25*a* decreases below the release threshold voltage, so that even if the AC switch 21*a* is turned on shortly after it is turned off, the output power of the power supply apparatus 20 is not immediately supplied to the controller 50.

The FET 28*a* is maintained in its latched state at least for several minutes even if the AC switch 21*a* is in the OFF state for the following reasons.

The FET 28*a* is maintained in its latched state for several minutes in order for the user to recognize the occurrence of "malfunction" in the power supply apparatus 20. In other words, if the FET 28*a* is switched to the latched state and the output power of the power supply apparatus 20 is no longer supplied to the image forming apparatus, most users may try to switch off and then back on again in a short time. If the image forming apparatus cannot be powered normally after repeating to switch on and off a few times, the users may usually believe that the power supply apparatus 20 has failed or malfunctioned. In this manner, the user is informed that the power supply apparatus 20 has failed.

Figure 5:
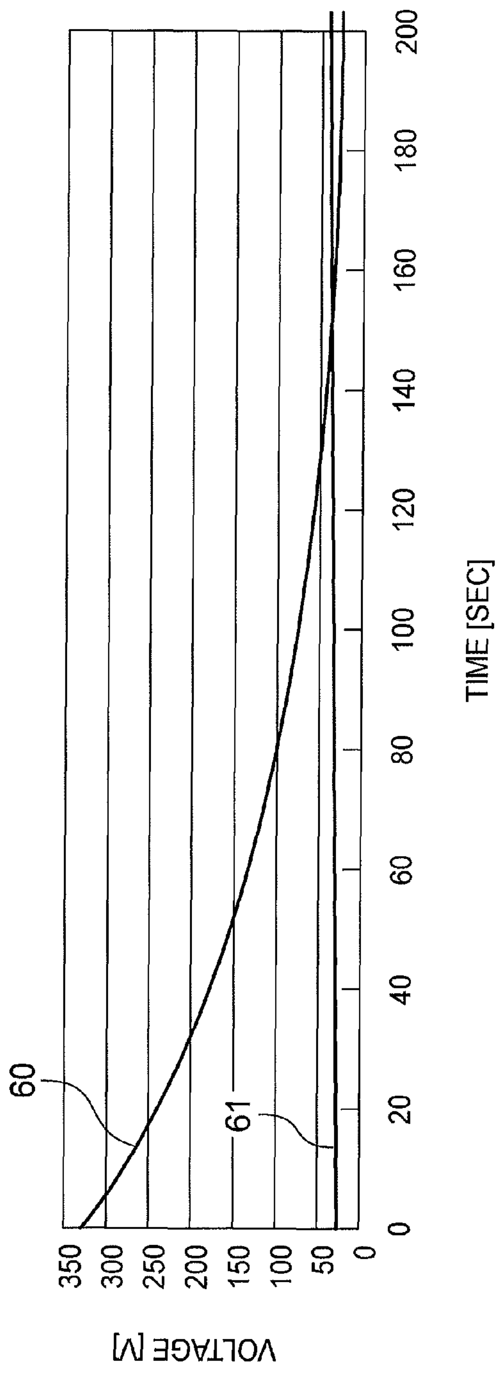
FIG. 5 shows the change in the charge remaining in the electrolytic capacitor in terms of voltage on the electrolytic capacitor after the AC switch shown in FIG. 3 is shifted to the OFF position.

FIG. 5 shows the change in the charge remaining in the electrolytic capacitor 25*a* in terms of voltage on the electrolytic capacitor 25*a* after the AC switch 21*a* shown in FIG. 3 is shifted to the OFF position.

FIG. 5 plots time in seconds as the abscissa and voltage in volts as the ordinate. Curve 60 represents the change in the voltage on the electrolytic capacitor 25*a* after the AC switch 21*a* is turned off and Curve 61 represents the change in the voltage on the electrolytic capacitor 25*a* when the FET 28*a* is normally switching.

The capacitance of the electrolytic capacitor 25*a* is selected such that the output power of the power supply apparatus 20 can be provided reliably even if the change in the load on the power supply apparatus 20 fluctuates. The resistance values of the resistors 25*b* and 25*c* are selected to be large in order to minimize power consumption by the resistors 25*b* and 25*c*. For example, the capacitance and resistances are as follows:

Capacitance of the electrolytic capacitor 25*a*: 330 μF
Resistance of resistor 25*b*: 100 kΩ
Resistance of resistor 25*b*: 100 kΩ

Assume that an abnormality occurred in the image forming apparatus as a load on the power supply apparatus 20 and the alarm signal ALM-P is inputted to the power supply apparatus 20. Two minutes and 37 seconds after the AC switch 21*a* is shifted to the OFF position, the voltage on the VH terminal P8 of the control IC 30 decreases below the release threshold voltage, so that the FET 28*a* is switched from the latched state to the released state and the AC switch 21*a* becomes ready to switch on again.

For example, assume that the AC input voltage is 230 V, and the release threshold voltage is 30 V below which the FET 28*a* can be switched from the latched state to the released state. The voltage on the electrolytic capacitor 25*a* after the AC switch 21*a* is shifted to the OFF position follows curve 60. When the voltage on the electrolytic capacitor 25*a* decreases to 30 V and two minutes and 37 seconds has passed after the AC switch 21*a* is shifted to the OFF position, the FET 28*a* is switched from the latched state to the released state and the AC switch 21*a* becomes ready to switch on again.

{Drawbacks of Comparative Example}

A recent trend is to reduce the power consumption of image forming apparatus. The Energy-related Products Directive (ErP directive) requires that electronic apparatus have an auto-off function in which if an image forming apparatus is in an idle state longer than a certain period of time, the supply of power to the image forming apparatus is shut off. The auto-off function may be implemented as follows: The switching operation of the FET 28*a* is halted and the secondary side output power is shut off, for example, in response to the alarm signal ALM-P shown in FIG. 3 or by using a circuit that operates upon detection of an excessive voltage.

Once the power supply apparatus is shut off in the auto-off process, electric power to the image forming apparatus is shut off. The switching operation of the FET 28*a* then remains halted until several minutes has passed even if the AC switch 21*a* remains turned off or until the voltage on the electrolytic capacitor 25*a* decreases below the release threshold voltage. Thus, the power supply apparatus 20 cannot be turned on again quickly, causing the user to wait a certain period of time before the image forming apparatus can normally operate.

One way of solving this drawback may be releasing the latched condition in a shorter time. However, a shorter releasing time is detrimental to the safe operation of the power supply apparatus. The alarm signal receiving section 41 shown in FIG. 3 is used for safe operation. Therefore, the time required for switching the FET 28*a* from the latched state to the released state after the AC switch 21*a* has been turned off cannot be merely shortened without good reasons. Thus, a need exists in the art for a means for implementing the auto-off function.

{Configuration of Power Supply Apparatus of First Embodiment}

Figure 6:
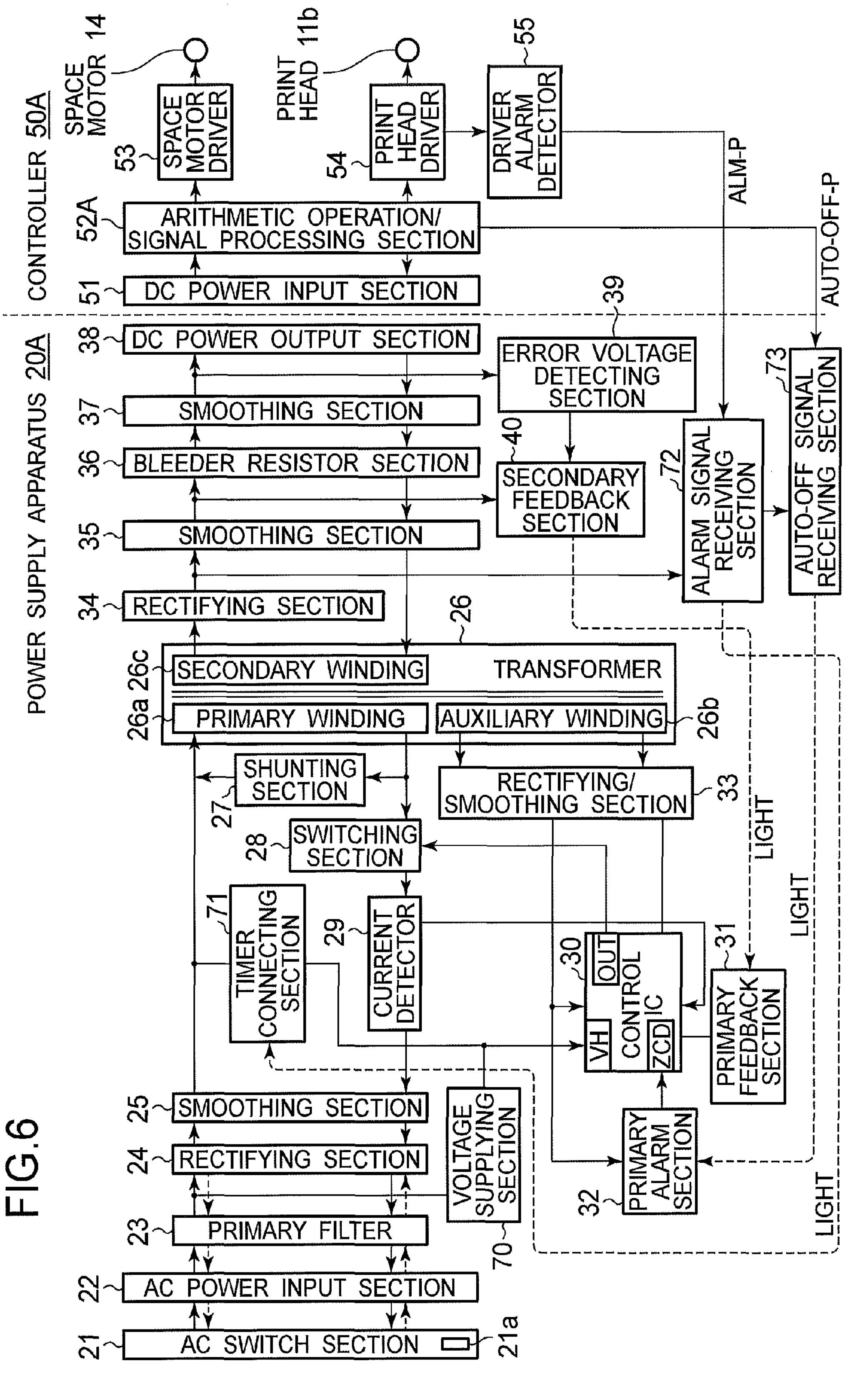
FIG. 6 is a block diagram of a power supply apparatus 20A according to a first embodiment.

FIG. 6 is a block diagram of a power supply apparatus 20A according to a first embodiment.

Elements similar to those in the power supply apparatus 20 (i.e., comparative example) have been given the same reference characters and their description is omitted.

The first embodiment differs from the comparative example in that the power supply apparatus 20A has a voltage supplying section 70 and a timer connecting section 71 on the primary side of the transformer 26, an alarm signal receiving section 72 on the secondary side of the transformer 26, and an auto-off signal receiving section 73 on the secondary side of the transformer 26. The auto-off signal receiving section 73 is used in place of the alarm signal receiving section 41 in the comparative example. Further, a controller 50A includes an arithmetic operation/signal processing section 52A in place of the arithmetic operation/signal processing section 52.

The voltage supplying section 70 is connected between the output of the primary filter 23 and the VH terminal P8 of the control IC 30, and applies the voltage on the capacitor of the primary side filter 23 to the VH terminal P8. The timer connecting section 71 is connected between the output of the smoothing section 25 and the VH terminal P3 of the control IC 30, and applies the voltage on the capacitor in the smoothing section 25 to the VH terminal P8. The timer connecting section 71 operates in response to the light emitted from the alarm signal receiving section 72, thereby supplying the voltage on the capacitor 25*a* in the smoothing section 25 to the VH terminal of the control IC 30. The timer connecting section 71 and the alarm signal receiving section 72 constitute a power disconnecting section that prevents the power supply apparatus 20 from outputting its regulated DC output when the alarm signal ALM-P or the auto-off signal AUTO-OFF is received.

The alarm signal receiving section 72 is connected to the output of the rectifying section 34, and monitors the output voltage of the rectifying section 34. If the alarm signal receiving section 72 detects an excess voltage higher than a predetermined value, the alarm signal receiving section 72 causes the timer connecting section 71 to operate. Alternatively, if the alarm signal ALM-P is received from a driver alarm detector 55, the alarm signal receiving section 72 emits light in response to the alarm signal ALM-P transmitted from the driver alarm detector 55 in the controller 50, thereby causing the timer connecting section 71 to operate. The auto-off signal receiving section 73 is connected to the output of the alarm signal receiving section 72 and emits light in response to an auto-off signal AUTO-OFF-P, thereby causing a primary alarm section 32 on the primary side of the transformer 26 to operate. Also, the auto-off signal receiving section 73 emits light in response to the light emission from the alarm signal receiving section 72, thereby causing the primary alarm section 32 to operate. The primary alarm section 32 and the auto-off signal receiving section 73 constitute an auto-off section when the auto-off signal AUTO OFF-P is received.

The arithmetic operation/signal processing section 52A controls the respective sections in the controller 50, and includes a CPU and LSIs. The arithmetic operation/signal processing section 52A generates control signals for controlling the space motor driver 53, print head driver 54, and outputs the auto-off signal AUTO-OFF-P to the auto-off signal receiving section 73. The AUTO-OFF-P is a trigger signal for automatically turning off the power supply apparatus 20A if the image forming apparatus remains idle longer than a predetermined period of time. When the AUTO-OFF-P is input to the power supply apparatus 20A, the output power of the power supply apparatus 20 is shut off. The AUTO-OFF-P allows the AC power to be supplied promptly to the power supply apparatus when the AC switch 21*a* is switched on again after having been switched off due to malfunction. The other portions of the configuration are the same as those of the comparative example.

Figure 7:
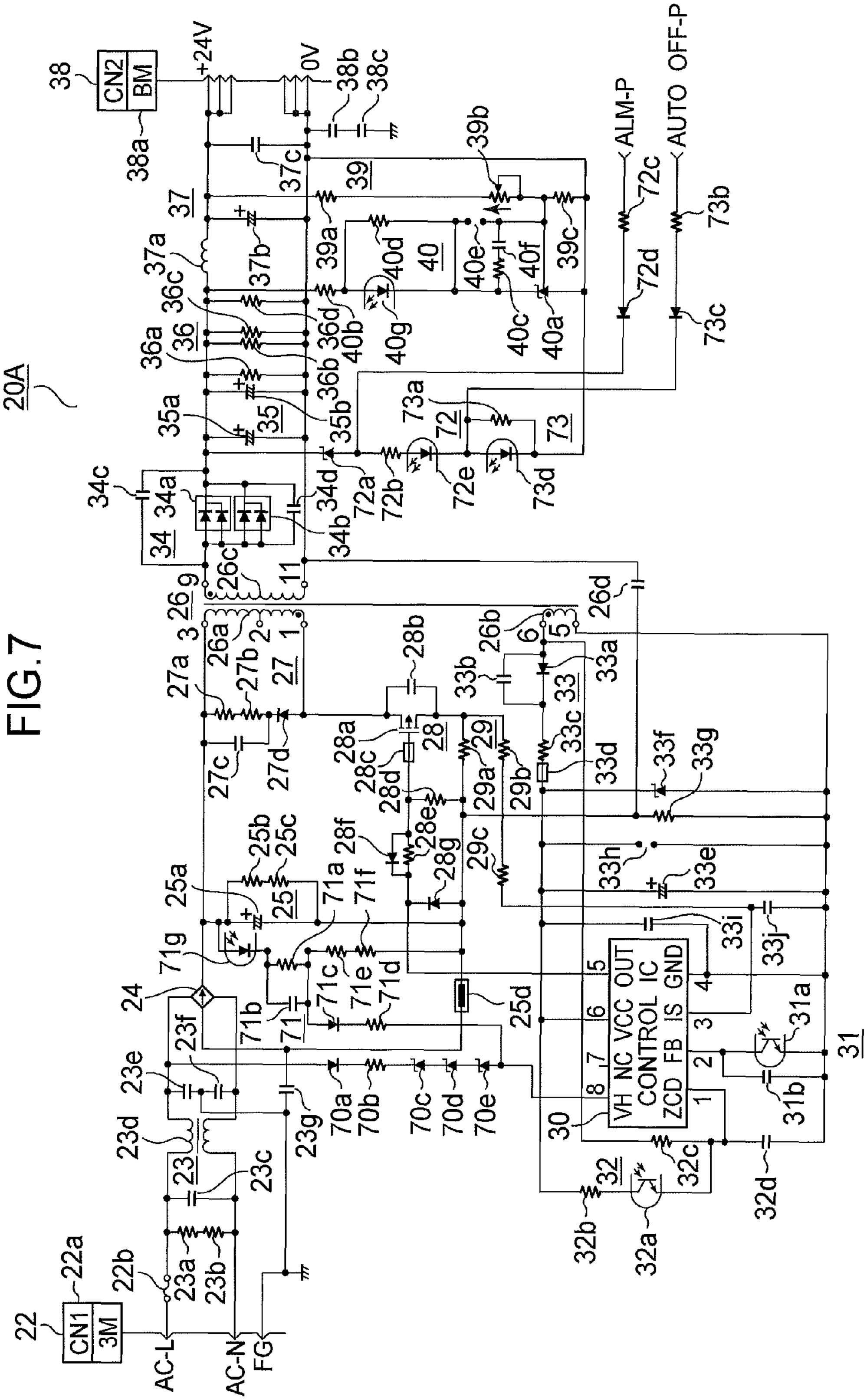
FIG. 7 is a schematic diagram illustrating the configuration of the power supply apparatus according to a first embodiment.

FIG. 7 is a schematic diagram illustrating the configuration of the power supply apparatus 20A. Elements similar to those of the comparative example have been the same reference characters and their description is omitted.

The voltage supplying section 70 rectifies the AC voltage on the AC-L line at the output of the primary filter 23, and supplies the rectified voltage to the VH terminal P8 of the control IC 30. The voltage supplying section 70 includes a diode 70*a*, resistor 70*b*, a plurality of Zener diodes 70*c*, 70*d*, and 70*e*, which form a series circuit connected between the electrode of the capacitor 23*e* and the VH terminal P8. For example, each Zener diode has a zener voltage of about 27 V. The resistor 33*g*, power thermistor 25*d*, and one of four diodes in the rectifier 24 make a return path for the current rectified by the diode 70*a*. The control IC 30 as a controller and the FET 28*a* as a switching element constitute a switching section that switches the current flowing through the primary winding 26*a*. The capacitor 33*e* is charged by the voltage obtained by half-wave rectifying the output of the auxiliary winding 26*b*. The control IC 30 operates on the voltage applied to the VH terminal of the control IC 30 or the voltage applied to the VCC terminal of the control IC 30. The VH terminal and VCC terminal are connected through an internal circuit.

The timer connecting section 71 operates in response to the light emitted by the alarm signal receiving section 72 and supplies the voltage on the electrolytic capacitor 25*a* in the smoothing section 25. The timer connecting section 71 includes a resistor 71*a*, a capacitor 71*b*, a diode 71*c*, resistors 71*d*, 71*e*, and 71*f*, and a phototriac 71*g*. The phototriac 71*g* turns on in response to the light emitted from the alarm signal receiving section 72. The phototriac 71*g* has its anode connected to the positive electrode of the electrolytic capacitor 25*a* of the smoothing section 25 and its cathode connected to the VH terminal P8 of the control IC 30 through a parallel circuit of the resistor 71*a* and capacitor 71*b*, the diode 71*c*, and the resistor 71*d*. The cathode of the phototriac 71*g* is connected to the negative electrode of the electrolytic capacitor 25*a* through a parallel circuit of the resistor 71*a* and capacitor 71*b* and a series circuit of the resistors 71*e* and 71*f*.

The alarm signal receiving section 72 includes a Zener diode 72*a*, resistors 72*b* and 72*c*, a diode 72*d*, and a light emitting device 72*e*. The light emitting device 72*e* and the phototriac 71*g* constitute a phototriac coupler. The alarm signal ALM-P is applied to the anode of the light emitting device 72*e* through the resistor 72*c*, diode 72*d* and resistor 72*b*. The junction of the diode 72*d* and resistor 72*b* is connected to the positive electrode of the rectifying section 34 through a Zener diode 72*a*. The light emitting device 72*e*, which is a part of the phototriac coupler, emits when voltage is applied thereto, thereby causing the phototriac 71*g*, which is a part of the phototriac coupler, to turn on. In the phototriac coupler, once the phototriac 71*g* turns on, it remains turned on even if the light emitting device 72*e* stops emitting light.

The auto-off signal receiving section 73 includes resistors 73*a* and 73*b*, a diode 73*c*, and a light emitting device 73*d*. The light emitting device 73*d* and photo transistor 32*a* constitute a photo coupler. The auto-off signal AUTO-OFF-P is inputted through the resistor 73*b* and diode 73*c* to the anode of the light emitting device 73*d*. The anode of the light emitting device 73*d* is connected to the cathode of the light emitting device 72*e*. The resistor 73*a* is connected between the anode and cathode of the light emitting device 73*d*. The light emitting device 73*d* emits light upon application of voltage, thereby causing a photo transistor 32*a* to turn on. The other portions of the configuration are the same as those of the comparative example shown in FIG. 3.

{Operation of First Embodiment}

The outline of the auto-off signal process will be described below.

Once an auto-off signal (AUTO-OFF-P) is received, the light emitting device 73*d* emits light, causing the photo transistor 32*a* to turn on so that the voltage on the ZCD terminal is higher than the latch threshold voltage of the latch circuit set in the control IC 30. Thus, turning on the photo transistor triggers a latch circuit built in the control IC 30 to hold the auto-off state. Thus, the control IC 30 stops outputting a switching signal from the OUT terminal P5 to the FET 28*a*, causing the FET 28*a* to stop switching on and off so that the DC supply voltage on the VCC terminal of the control IC 30 is lost. Thus, the power supply apparatus 20A enters an auto-off state.

After the latch circuit has been triggered, the voltage is still applied to the VH terminal P8 through the diode 70*a*, resistor 70*b*, Zener diodes 70*c*, 70*d* and 70*e*. The voltage applied to the VH terminal P8 is also applied to the VCC terminal P6 via an internal circuit in the control IC 30, thus enabling the control IC 30 to normally operate. The latch circuit remains latched even if the auto-off signal (AUTO-OFF-P) disappears, until the voltage on the VH terminal P8 decreases below the release threshold voltage of the latch circuit set in the control IC 30. In order to release the latch circuit from the latched state, the voltage on the VH terminal P8 must be decreased below the release threshold voltage. If the user turns off the AC switch 21*a* when the power supply apparatus 20A is in the auto-off state, the voltage is no longer applied to the VH terminal through the diode 70*a*, resistor 70*b*, and Zener diodes 70*c*, 70*d*, and 70*e*, so that the voltage on the VH terminal IC 30 decreases to zero volts. If the user then turns on the Ac switch 21*a* again, the power supply apparatus 20A will return from the auto-off state to the normal operating state.

The outline of the alarm signal process will be described below.

Once the alarm signal (ALM-P) is received, the light emitting device 72*e* emits light, causing the phototriac 71*g* to turn on, and the light emitting device 73*d* emits light, causing the photo transistor 32*a* to turn on. Since the phototriac 71*g* has turned on, the voltage on the capacitor 25*a* is applied to the VH terminal of the control IC 30. The voltage rectified by the diode 70*a* is also applied to the VH terminal of the control IC 30 through the resistor 70*b* and Zener diodes 70*c*, 70*d*, and 70*e*. The voltage on the VH terminal P8 is fed to the VCC terminal P6 via the internal circuit in the control IC 30, so that the control IC 30 normally operates.

Since the photo transistor 32*a* has turned on, the voltage on the ZCD terminal exceeds the latch threshold voltage to trigger the latch circuit in the control IC 30 and triggers the latch circuit. The latch circuit holds the latched state even if the alarm signal (ALM-P) disappears. The latched state lasts until the voltage on the VH terminal P8 decreases below the release threshold voltage set in the control IC 30.

If the user turns off the AC switch 21*a* after the latch circuit has been triggered, the voltage rectified by the diode 70*a* and applied to the VH terminal P8 via the diode 70*a*, resistor 70*b*, and Zener diodes 70*c*, 70*d*, and 70*e* will decrease quickly. The voltage on the capacitor 25*a* will then gradually decrease mainly through the resistors 25*b* and 25*c* in accordance with the time constant given by the capacitor 25*a* and resistors 25*b* and 25*c*. Once the voltage on the capacitor 25*a* decreases below the release threshold voltage set in the control IC 30, the latch circuit is released from the latched state. If the user then turns on the AC switch 21*a* again, the power supply apparatus 20A will return from the alarm state to the normal operating state.

When the +24 V output power increases in voltage above a certain voltage due to, for example, fluctuation in the input power, the same operation as the alarm signal process is performed to protect the power supply apparatus 20A.

Figure 8:
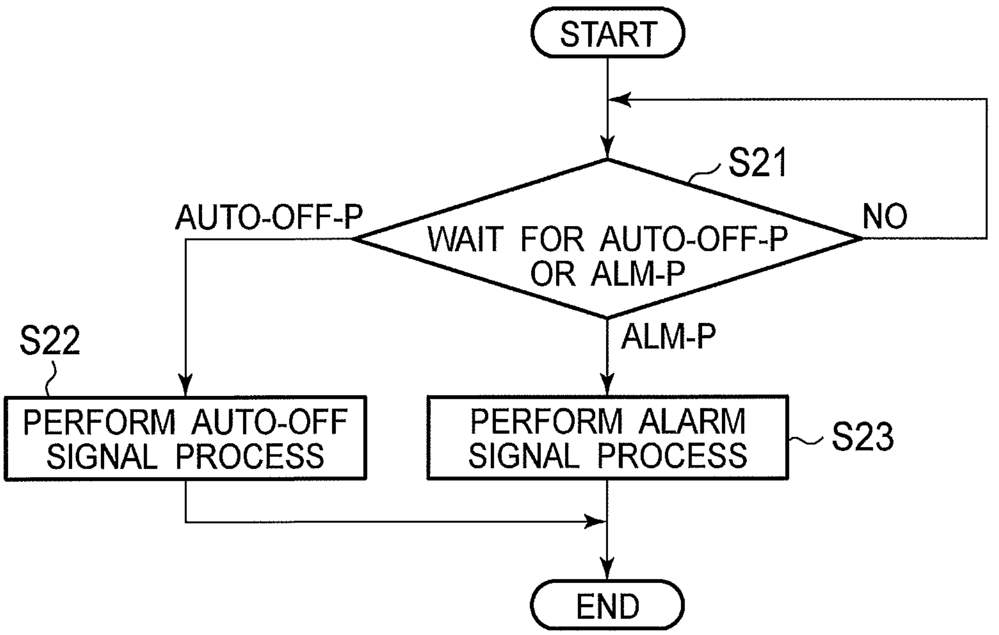
FIG. 8 is a flowchart illustrating the overall operation of the power supply apparatus shown in FIG. 6 and FIG. 7.

FIG. 8 is a flowchart illustrating the overall operation of the power supply apparatus 20A shown in FIG. 6 and FIG. 7.

The power supply apparatus 20A begins to operate.

S21: The power supply apparatus 20A waits for the auto-off signal AUTO-OFF-P or the alarm signal ALM-P from the controller 50A. Just as in the comparative example, the power supply apparatus 20A receives the AC power through the AC switching section 21 and AC input section 22, and outputs regulated stable DC power from the DC power output section 38. The space motor driver 53 drives the space motor 14 (FIG. 1) and the print head driver 54 drives the print head 11*b* (FIG. 1), thereby printing on the sheet of print medium.

A decision is made to determine whether the AUTO-OFF-P is received or the ALM-P is received.

S22: Upon reception of the auto-off signal AUTO-OFF-P from the arithmetic operation/signal processing section 52A of the controller 50A, the program proceeds to S22 where an auto-off signal process is performed and then the program ends.

S23: Upon reception of the alarm signal ALM-P outputted from the driver alarm detector 55 of the controller 50A, the program proceeds to S23 where an alarm signal process is performed and then the program ends.

Figure 9:
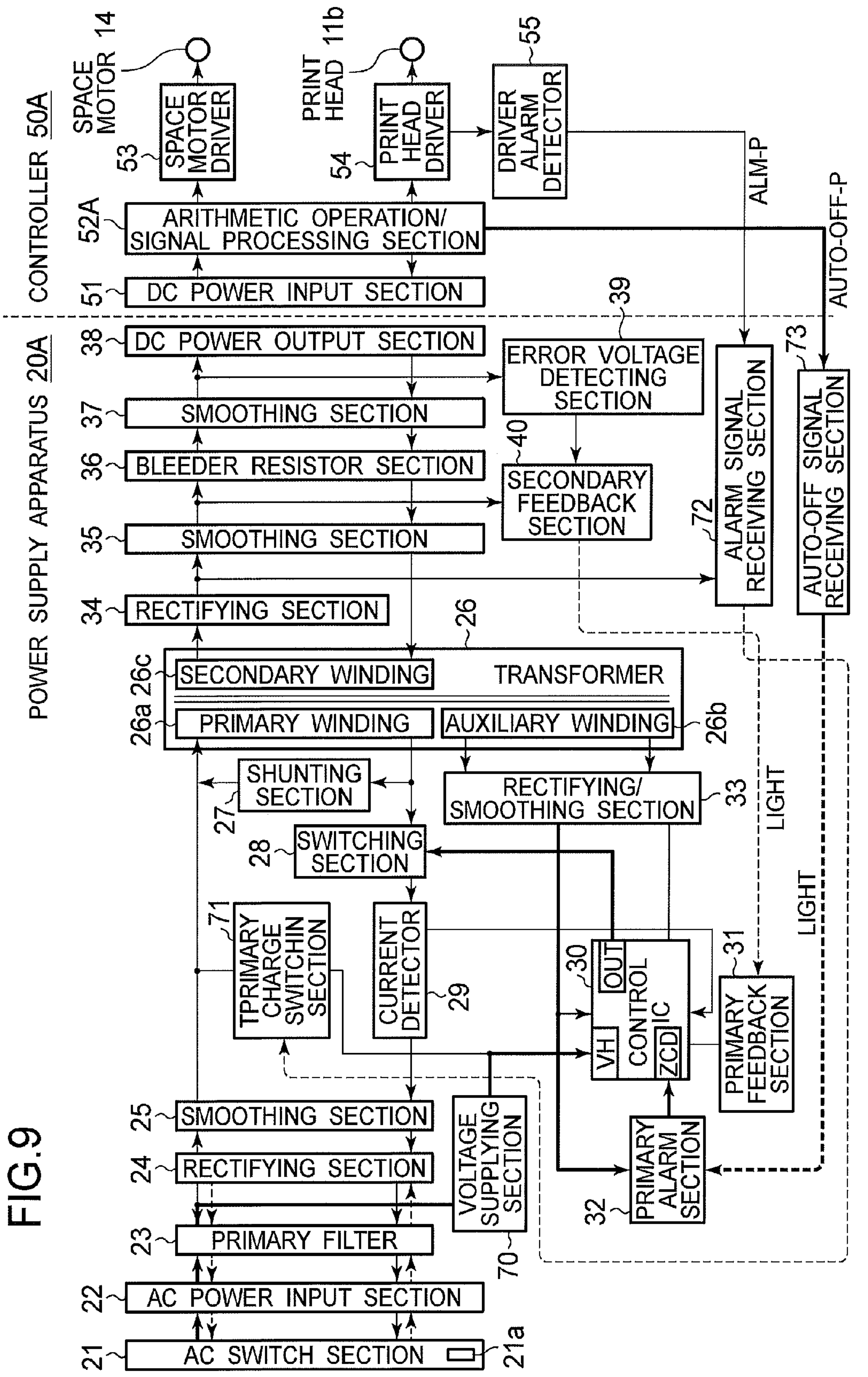
FIG. 9 is a block diagram of the power supply apparatus, illustrating the auto-off signal process.

FIG. 9 is a block diagram of the power supply apparatus 20A, illustrating the auto-off signal process in S23 shown in FIG. 8. FIG. 9 corresponds to FIG. 6.

The solid line in FIG. 9 shows the flow of signals when the auto-off signal AUTO-OFF-P is generated in the controller 50A and the power supply apparatus 20A is shut off automatically accordingly.

Figure 10:
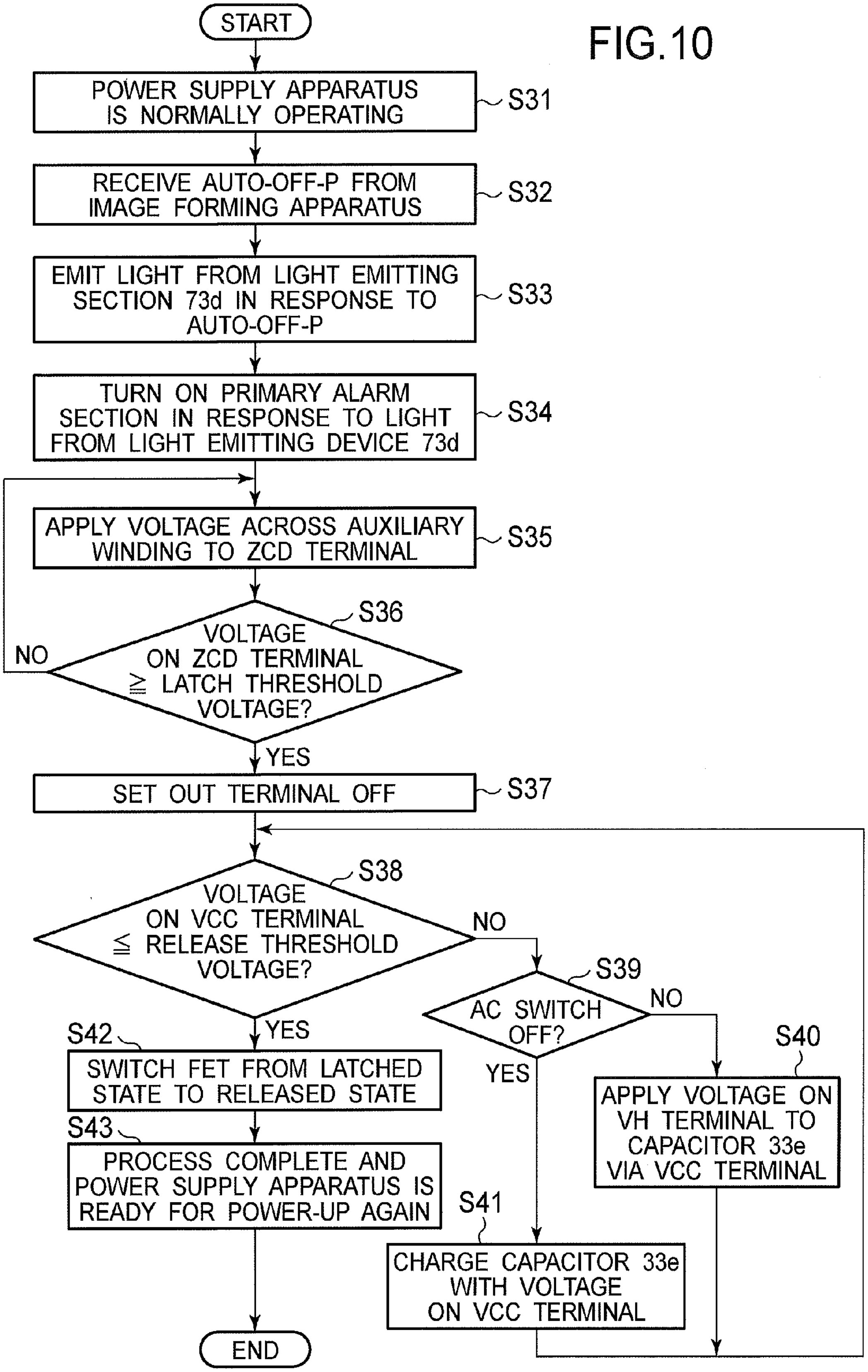
FIG. 10 is a flowchart illustrating the operation of the auto-off signal process when the auto-off signal is received and the power supply apparatus according to the first embodiment is shut off automatically.

FIG. 10 is a flowchart illustrating the operation of the auto-off signal process when the auto-off signal AUTO-OFF-P is received and the power supply apparatus 20A is shut off automatically accordingly.

The flowchart shown in FIG. 10 will be described with reference to FIGS. 7 and 9.

S31: The power supply apparatus 20A is normally operating.

S32: If the power supply apparatus 20A remains idle longer than a predetermined period of time, the arithmetic operation/signal processing section 52A sends the auto-off signal AUTO-OFF-P to the power supply apparatus 20A.

S33: Upon reception of the auto-off signal AUTO-OFF-P, the light emitting device 73*d* of the auto-off signal receiving section 73 emits light.

S34: In response to the light emitted from the light emitting device 73*d*, the photo transistor 32*a* in the primary alarm section 32 turns on.

S35: The voltage outputted from the auxiliary winding 26*b* of the transformer 26 is applied to the ZCD terminal P1 through the diode 33*a*, resistor 33*c*, coil 33*d*, and photo transistor 32*a*.

S36: The control IC 30 compares the voltage on the ZCD terminal with the latch threshold voltage. If the voltage on the ZCD terminal≥the latch threshold voltage (YES at S36), the program proceeds to S37. The latch threshold voltage may be, for example, 7.2 V, and if the voltage on the ZCD terminal remains equal to or higher than 7.2 V for at least 57 μs, it may be determined that the voltage on the ZCD terminal≥the latch threshold voltage.

S37: The control IC 30 sets the OUT terminal P5 to the off state, thereby switching the FET 28*a* to the latched state where the FET 28*a* remains turned off. In the latched state, the capacitor 33*e* is no longer charged by the DC voltage obtained by rectifying the voltage across the auxiliary winding 26*c*. If the voltage on the ZCD terminal<the latch threshold voltage (NO at S36), the program jumps back to S35 where the control IC 30 allows the FET 28*a* to continue its switching operation until the voltage on the ZCD terminal increases so that the voltage on the ZCD terminal≥the latch threshold voltage.

S38: The control IC 30 compares the voltage on the VCC terminal P6 with the reference voltage set in the control IC 30. If the voltage on the VCC terminal>the release threshold voltage (e.g., 7 V) (NO at S38), the program proceeds to S39.

S39: If the AC switch 21*a* is not in the off position (NO at S39), the program proceeds to S40.

S40: The output of the choke coil 23*d* is half-wave rectified the diode 70*a* and is then applied to the VH terminal P8 through a series circuit of the resistor 70*b* and Zener diodes 70*c*, 70*d*, and 70*e*. The voltage on the VH terminal P9 of the control IC 30 is the difference between the voltage half-wave rectified by the diode 73*a* and the voltage across the Zener diodes 70*c*, 70*d*, and 70*e*. Therefore, the voltage on the VH terminal P8 continues to charge the capacitor 33*e*, so that the voltage on the VCC terminal of the control IC 30 will not decrease below the reference voltage below which the FET 28*a* is switched from the latched state to the released state. Thus, the program jumps back to S38 and the FET 28*a* remains in the latched state until the AC switch 21*a* is shifted to the OFF position.

S39: If the AC switch 21*a* is shifted to the OFF position (YES at S39), the program proceeds to S41.

S41: When the AC switch 21*a* is shifted to the OFF position, the voltage on the capacitor 23*c* discharges through the resistors 23*a* and 23*b* and the voltage on the electrolytic capacitor 33*e* is consumed by the control IC 30 so that the voltage on the VCC terminal of the control IC 30 decreases below the release threshold voltage. The program then returns to S38.

S38: if the voltage on the VCC terminal≤the release threshold voltage, e.g., 7V (YES at S36), the program proceeds to S42.

S42: The control IC 30 switches the FET 28*a* from the latched state to the released state.

S43: The FET 28*a* has been switched to the released state and the AC power can now be switched on again.

Figure 11:
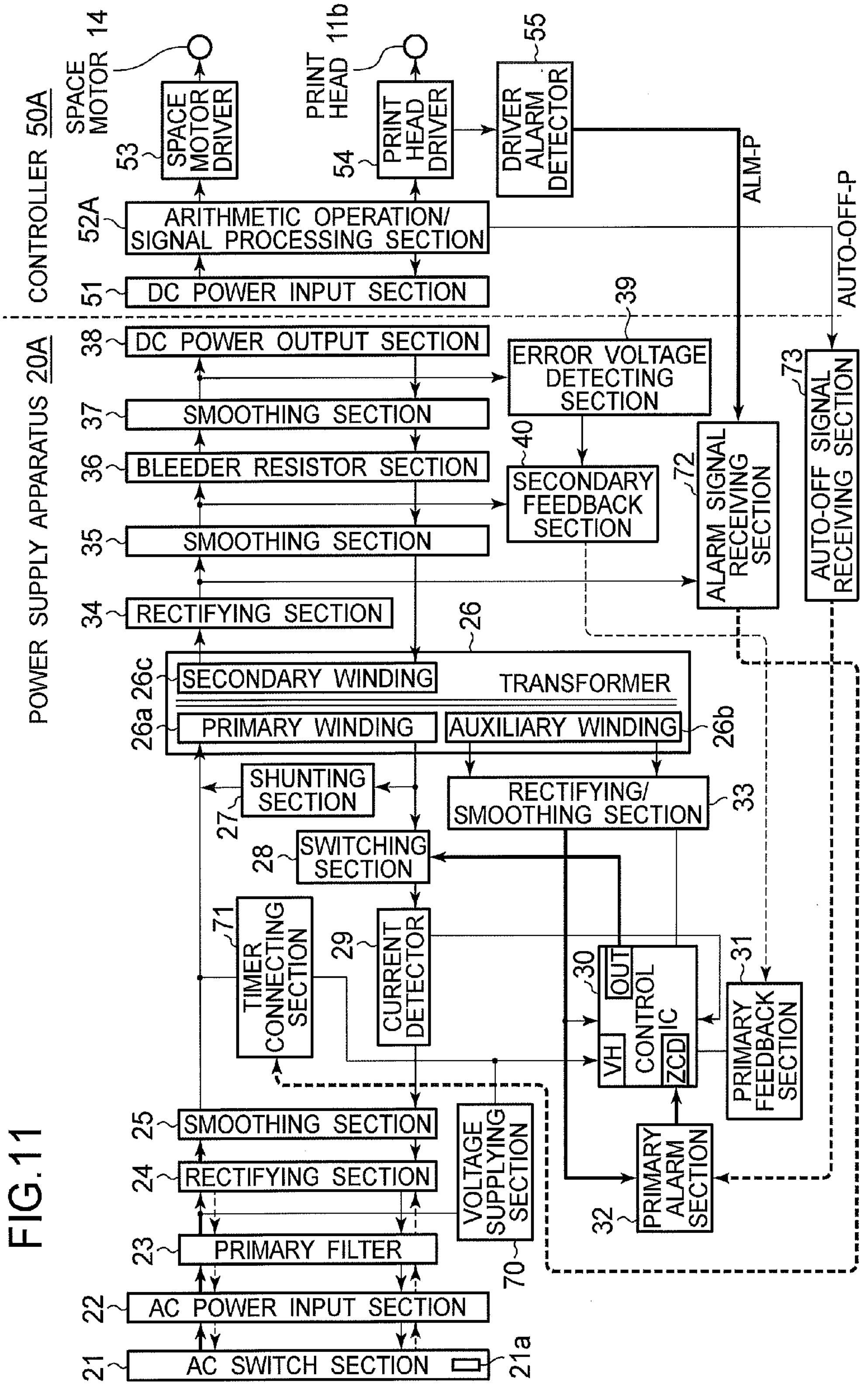
FIG. 11 is a block diagram illustrating the operation at S24 shown in FIG. 8 where the alarm signal is processed.

FIG. 11 is a block diagram illustrating the operation at S24 (FIG. 8) where the alarm signal is processed. FIG. 11 corresponds to FIG. 6.

The solid line in FIG. 11 shows the flow of signals when the auto-off signal AUTO-OFF-P is generated and the power supply apparatus 20A is therefore shut off automatically.

Figure 12:
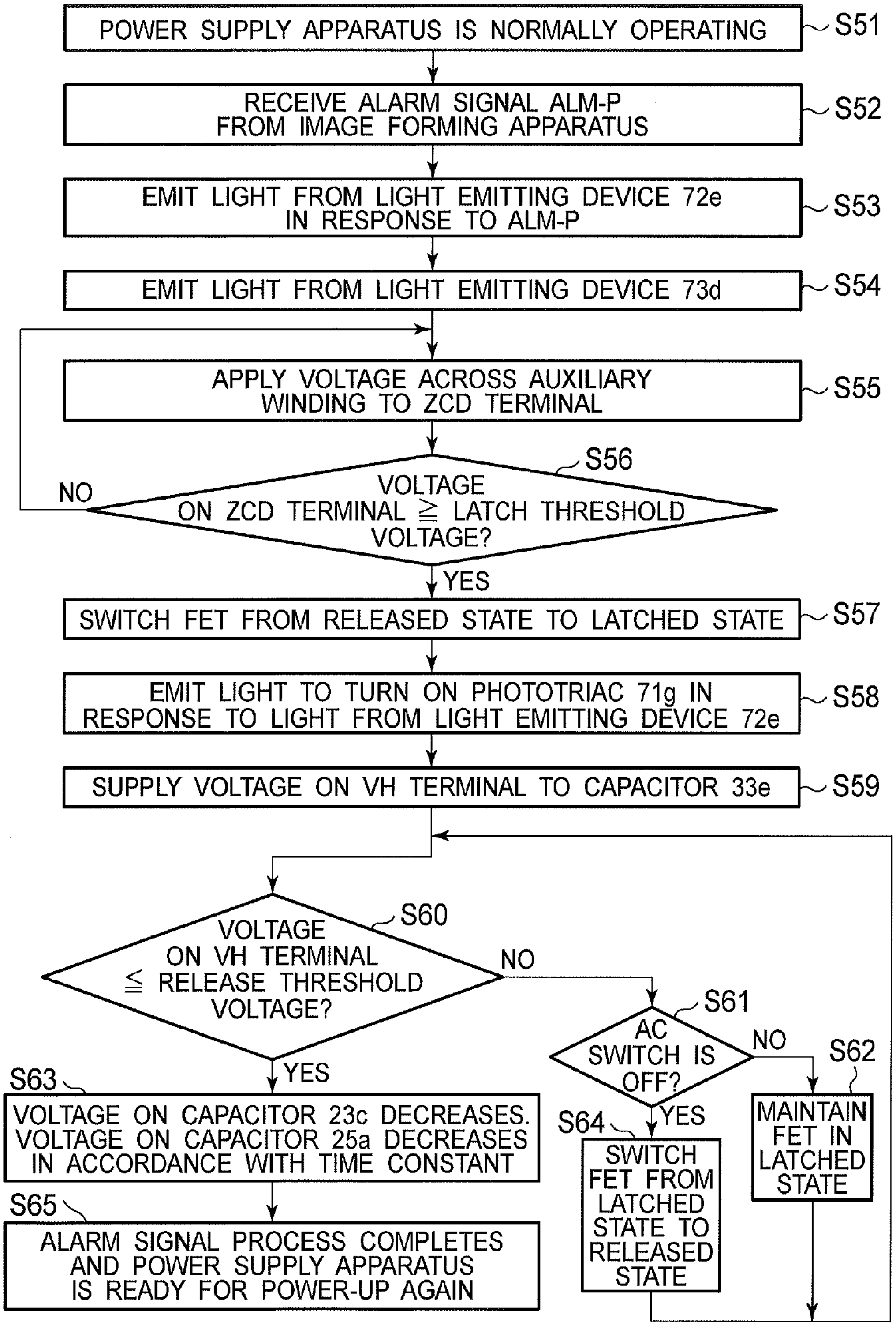
FIG. 12 is a flowchart illustrating the operation at S24 shown in FIG. 8 where the alarm signal is processed.

FIG. 12 is a flowchart illustrating the operation at S24 (FIG. 8) where the alarm signal process is performed.

The flowchart illustrates the operation for shutting off the power supply apparatus 20A in response to the alarm signal ALM-P.

The flowchart will be described with reference to FIGS. 7, 11, and 12.

S51: The power supply apparatus 20A is normally operating.

S52: Upon malfunction of the space motor driver 53 or the print head driver 54 of the controller 50A, the driver alarm detector 55 generates the alarm signal ALM-P.

S53: In response to the alarm signal ALM-P, the light emitting device 72*e* of the phototriac coupler in the alarm signal receiving section 72 and the light emitting device 73*d* in the auto-off signal receiving section 73 emit light. The program then proceeds to S54.

S54: The light emitting device 73*d* in the auto-off signal receiving section 73 emits light, so that the photo transistor 32*a* in the alarm section on the primary side of the transformer 26 turns on. The program then proceeds to S55.

S55: The voltage across the auxiliary winding 26*b* is applied to the ZCD terminal P1 of the control IC 30 through the rectifying/smoothing section 33 and the photo transistor 32*a*. The program then proceeds to S56.

S56: The control IC 30 compares the voltage on the ZCD terminal with the latch threshold voltage. If the voltage on the ZCD terminal<the latch threshold voltage (NO at S56), the program jumps back to S55 and the control IC 30 will allow the FET 28*a* to continue its switching operation until the voltage on the ZCD terminal increases. If the voltage on the ZCD terminal≥the latch threshold voltage (YES at S56), the program proceeds to S57.

S57: The control IC 30 turns off the OUT terminal P5, thereby controlling the FET 28*a* through the resistor 28*e* so that the FET 28*a* is switched to the latched state. Once the FET 28*a* stops its switching operation, the capacitor 33*e* is no longer charged by the voltage from the auxiliary winding 26*b*. Then the program proceeds to S58.

S58: The light emitting device 72*e* emits light, and so the phototriac 71*g* of the phototriac coupler turns on. The program then proceeds to S59.

S59: The VH terminal P8 receives the voltage half-wave rectified by the diode 70*a* and the voltage supplied from the capacitor 25*a*, the voltages charging the electrolytic capacitor 33*e*. The program then proceeds to S60.

S60: The control IC 30 compares the voltage on the VH terminal with the release threshold voltage. If the voltage on the VH terminal>the release threshold voltage (NO at S60), the program proceeds to S61.

S61: If the AC switch 21*a* is not in the OFF position (NO at S61), the program proceeds to S62:

S62: Since the voltage on the VH terminal of the control IC 30 charges the electrolytic capacitor 33*e* via the VCC terminal, the voltage on the electrolytic capacitor 33*e* will not decrease. For this reason, the FET 28*a* continues to be latched unless the AC switch 21*a* is actually switched off.

If the AC switch 21*a* is actually switched off (YES at S61), the program proceeds to S63.

S63: Once the AC switch 21*a* is switched off, the AC power is no longer supplied to the power supply apparatus 20A, so that the voltage on the capacitor 23*c* is discharged through the resistors 23*a* and 23*b* and the voltage half-wave rectified by the diode 70*a* will decrease in a short time. The voltage on the capacitor 25*a* slowly decreases in accordance with the time constant given by the capacitor 25*a* and resistors 25*b* and 25*c*, the voltage being higher than the reference voltage set in the control IC 30 and lasting longer than the voltage supplied by the diode 70*a*. The voltage on the electrolytic capacitor 33*e*, connected to the VCC terminal P6, is discharged through the control IC 30, and therefore the voltage on the VCC terminal decreases. The program then returns to S60.

S60: If the voltage on the VH terminal≤the release threshold voltage (YES at S60), the program proceeds to S63.

S63: the control IC 30 switches the FET 28*a* from the latched state to the released state.

S65: The alarm signal process completes and the power supply apparatus 20A can now be switched on again.

The process at S54, S55, S56, and S57 may be performed concurrently with the process at S58.

Figure 13:
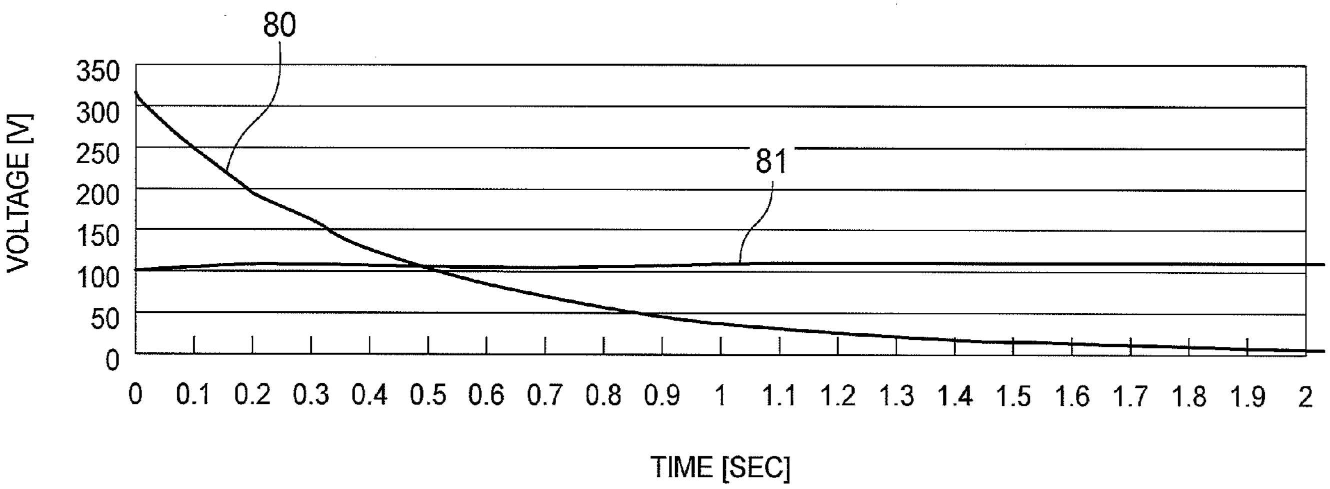
FIG. 13 illustrates the charge remaining in the capacitor after the AC switch is switched off.

FIG. 13 illustrates the charge remaining in the capacitor 23*c* after the AC switch 21*a* (FIG. 7) is switched off.

FIG. 13 plots time as the abscissa and voltage as the ordinate. Curve 80 shows the voltage on the capacitor 23*c* after the Ac switch 21*a* is switched off. Curve 81 shows the voltage on the capacitor 23*c* when the FET 28*a* is switched from the latched state to the released state. The charge remaining in the capacitor 23*c* after the AC switch 21*a* is switched off will be described with reference to FIG. 13.

The capacitor 23*c* and resistors 23*c* and 23*b* through which the voltage on the capacitor 23*c* is discharged must meet requirements in the immunity test and the residual charge decay time requirements of IEC 60950 safety standards. For this reason, the capacitance of the capacitor 23*c* and the resistance of the resistors 23*a* and 23*b* are selected to meet the discharge time requirements and noise filtering requirement.

The voltage on the VH terminal P9 of the control IC 30 is the difference between the voltage half-wave rectified by the diode 73*a* and the voltage across the Zener diodes 70*c*, 70*d*, and 70*e*. Assume that capacitor 23*c* and resistors 23*a* and 23*b* have the following values.

Capacitor 23*c*: 0.47 μF

Resistor 23*a*: 470 kΩ

Resistor 23*b*: 470 kΩ

About 0.47 seconds after the AC switch 21*a* is switched off, the voltage on the VH terminal P8 of the control IC 30 decreases to the release threshold voltage, thus enabling the AC switch 21*a* to be switched on again.

Assume that the AC input voltage is 230 V, and the release threshold voltage is 30 V.

The voltage on the capacitor 23*c* follows Curve 80 after the AC switch 21*a* has been switched off. When the voltage on the capacitor 23*c* is 111 V 0.47 seconds after the AC switch 21*a* is switched off, the FET 28*a* is switched from the latched state to the released state so that the AC switch 21*a* can be switched on again.

The voltage on the electrolytic capacitor 25*a* in the smoothing section 25 after the AC switch 21*a* is switched off follows Curve 60 (FIG. 5), assuming that the AC input voltage is 230 V and the release threshold voltage in the control IC 30 below which the FET 28*a* is switched from the latched state to the released state is 30 V. When the voltage on the electrolytic capacitor 25*a* has decreased to 30 V, i.e., about 157 seconds after the AC switch 21*a* is switched off the FET 28*a* is switched from the latched state to the released state so that the AC switch 21*a* can be switched on again after the AC switch 21*a* is switched off.

In this manner, the voltage on the capacitor 23*c* promptly decreases to the release threshold voltage in about 0.47 seconds, so the AC switch 21*a* can be switched on again promptly after the AC switch 21*a* is switched off. Conversely, the voltage on the electrolytic capacitor 25*a* decreases to the release threshold voltage about 157 seconds after the AC switch 21*a* is switched off. In other words, the user has to wait for about 157 seconds before the AC switch 21*a* can be switched on again after the AC switch 21*a* is switched off.

{Effects of First Embodiment}

The auto-off signal AUTO-OFF-P is used for automatically turning off the power supply of the image forming apparatus. The alarm signal ALM-P indicates the occurrence of an abnormality in the image forming apparatus. If the AUTO-OFF-P is received, the voltage on the capacitor 25*c* in the primary filter 23 of the power supply apparatus 20A is used to enable the prompt power-up after the AC switch 21*a* is switched off.

If the alarm signal ALM-P is received, the light emitting device 72*e* and the phototriac 71*g* operate so that the voltage on the capacitor 25*a* is used which has been charged by the full-wave rectified AC power by the rectifier 24 and smoothed by the smoothing section 25. Thus, a waiting time of several minutes can be ensured for safe operation of the power supply apparatus 20A before the AC switch 21*a* can be switched on again after the AC switch 21*a* is switched off.

Second Embodiment

{Configuration}

Figure 14:
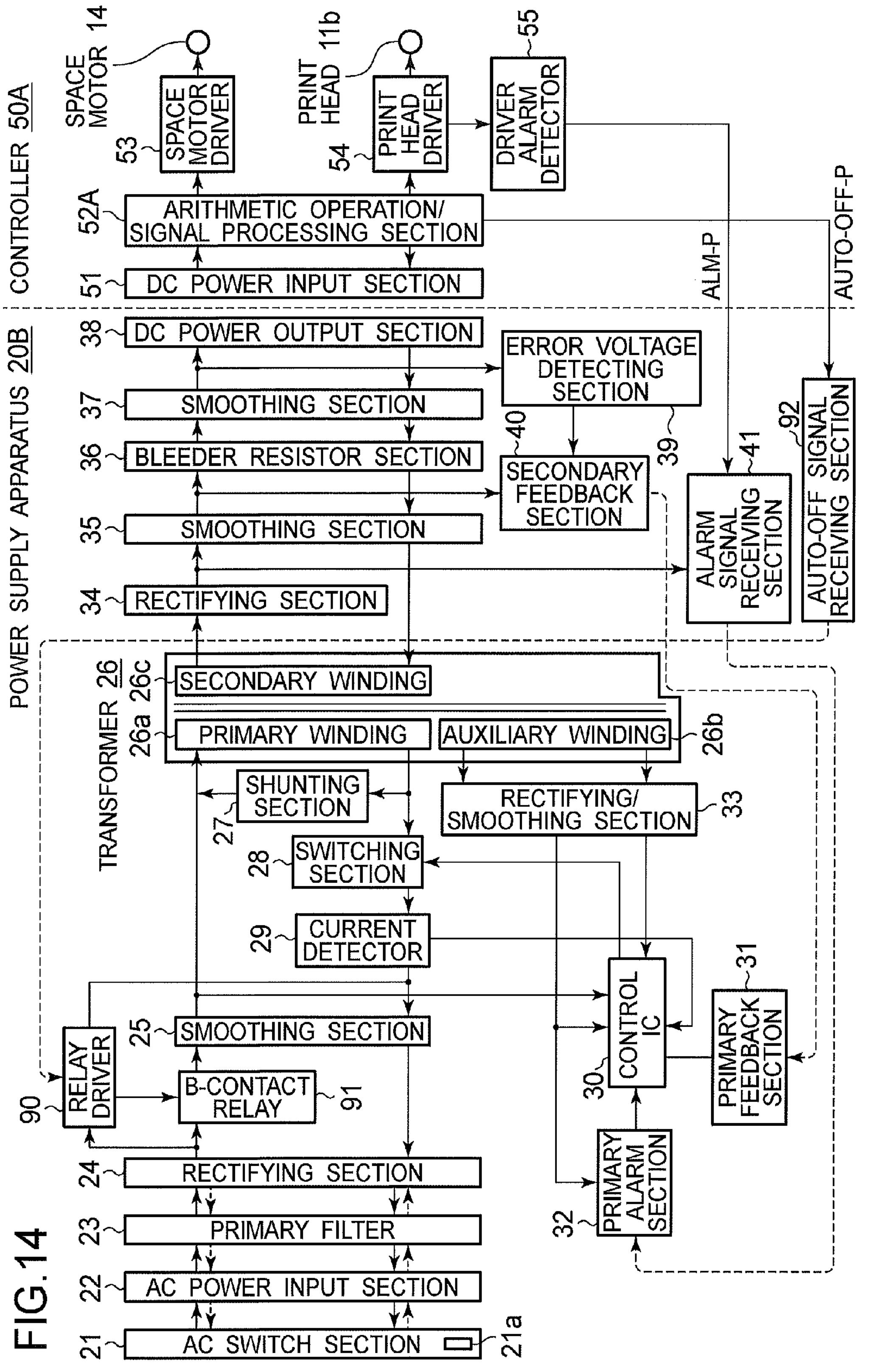
FIG. 14 is a block diagram of a power supply apparatus 20B according to a second embodiment.

FIG. 14 is a block diagram of a power supply apparatus 20B according to a second embodiment. Elements similar to those of the comparative example shown in FIG. 2 have been given the same reference numerals, and their description is omitted.

The power supply apparatus 20B according to the second embodiment differs from the power supply apparatus 20A in that a relay driver 90 and a B-contact relay 91 are used and an alarm signal receiving section 41 and an auto-off signal receiving section 92 are employed.

The relay driver 90 is connected to the output of the rectifier 24 and operates in response to the light emitted from the auto-off signal receiving section 92, thereby causing the B-contact relay 91. The B-contact relay 91 electrically connects or disconnects the rectifier 24 from smoothing section 25. The B-contact relay 91 is normally ON to connect between the smoothing circuit 24 and rectifier 25. Once the relay driver 90 operates, the B-contact relay 91 becomes off to electrically disconnect the rectifier 24 and smoothing section 25. The auto-off signal receiving section 92 operates to emit light in response to the auto-off signal AUTO-OFF-P transmitted from the arithmetic operation/signal processing section 52A, thereby causing the relay driver 90 on the primary side of the transformer 26.

The primary alarm section 32 and the alarm signal receiving section section 41 constitute a power disconnecting section. The relay driver 90 and B-contact relay 91 on the primary side of the transformer 26 and the auto-off signal receiving section 92 constitute an auto-off section. The other portions of the configuration are the same as those of the comparative example shown in FIG. 2 and the first embodiment.

Figure 15:
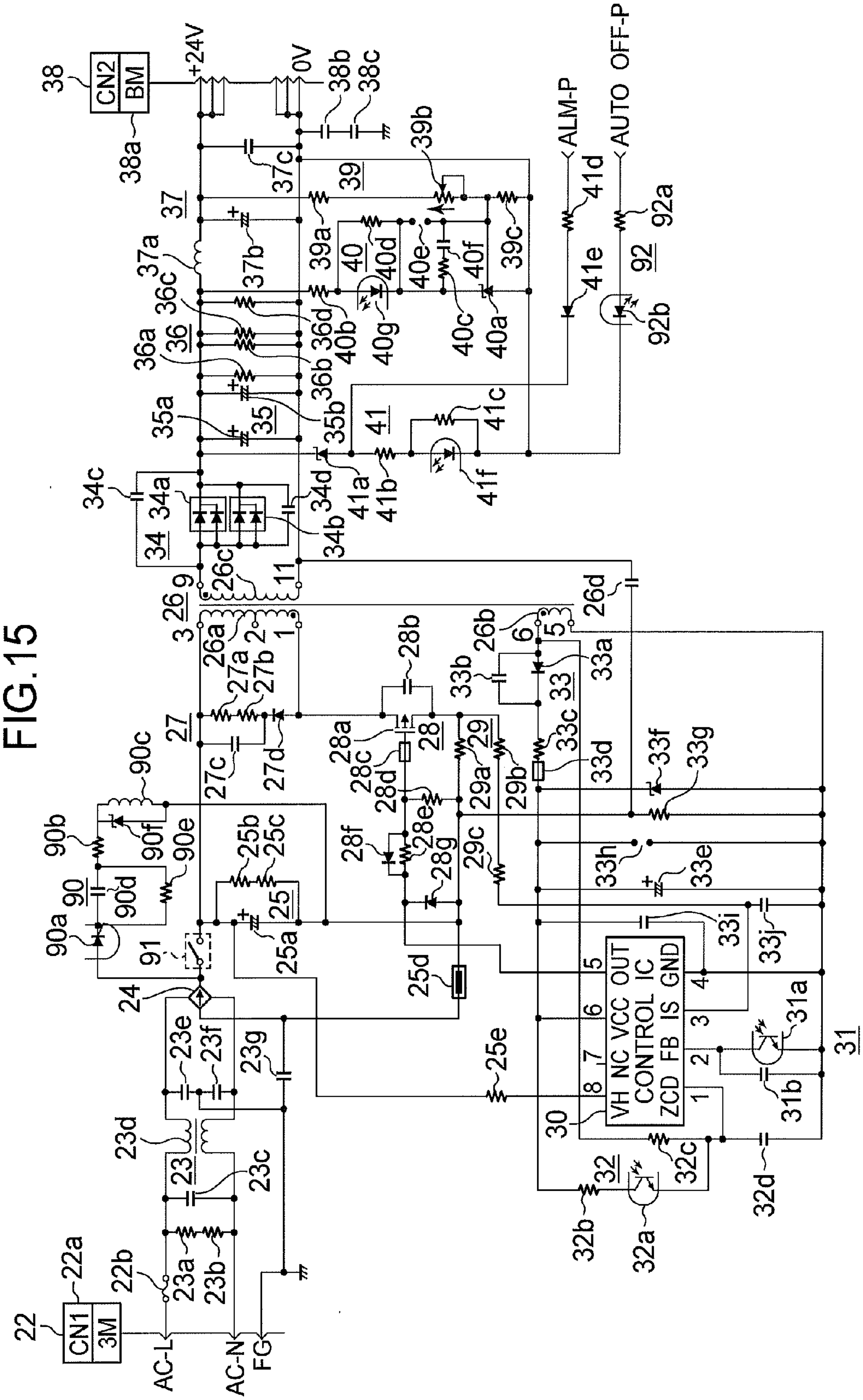
FIG. 15 is a schematic diagram illustrating the configuration of the power supply apparatus shown in FIG. 14.

FIG. 15 is a schematic diagram illustrating the configuration of the power supply apparatus 20B shown in FIG. 14.

The relay driver 90 includes a phototriac 90*a*, resistors 90*b* and 90*e*, an energizing coil 90*c*, a capacitor 90*d*, and a Zener diode 90*f*. The phototriac 90*a* receives the light emitted by a light emitting device 92*b*. The light emitting device 92*b* and the phototriac 90*a* constitute a phototriac coupler. A light emitting device 40*g* and a photo transistor 31*a* constitute a photo coupler. The phototriac 90*a* has its anode connected to the output of the rectifier 24 and its cathode connected to the negative electrode of the electrolytic capacitor 25*a* of the smoothing section 25 through the resistor 90*b* and energizing coil 90*c*.

The cathode of the phototriac 90*a* is connected to a parallel circuit of the capacitor 90*d* and resistor 90*e*. The energizing coil 90*c* is used to drive the B-contact relay 91. The energizing 90*c* is connected in parallel with a Zener diode 90*f*. The Zener diode 90*f* shunts the back electromotive force developed across the energizing coil 90*c*.

The B-contact relay 91 is connected between the output of the rectifier 24 and the smoothing section 25. When no current flows through the energizing coil 90*c* and therefore the energizing coil 90*c* is not energized, the relay contacts are closed. When current flows through the energizing coil 90*c* and therefore the energizing coil is energized, the relay contacts are open.

The auto-off signal receiving section 92 includes a resistor 92*a* through which the auto-off signal AUTO-OFF-P is inputted and the light emitting device 92*b* of the phototriac coupler. The light emitting device 92*b* is connected between the ground part of the resistor 92*a* and a light emitting device 41*f* in the alarm signal receiving section 41. The light emitting device 41*f* and a later described photo transistor 32*a* constitute a photo coupler. In response to the auto-off signal AUTO-OFF-P, the light emitting device 41*f* emits light, causing the phototriac 90*a* to turn on. The phototriac couplers behave as follows: Once the phototriac 90*a* is turned on, the phototriac 90*a* continues to be turned on, even if the light emitting device 92*b* stops emitting light. The other part of the configuration is the same as those of the comparative example shown in FIG. 3 and the first embodiment shown in FIG. 6.

{Operation of Second Embodiment}

The outline of the auto-off signal process will be described below.

Once an auto-off signal (AUTO-OFF-P) is received, the light emitting device 92*b* emits light, causing the phototriac 90*a* to turn on so that current flows through the energizing coil 90*c* to make the contacts of the relay 91 open. The relay 91 has a short delay time for the contacts to open. In other words, the contacts will not open for a short time immediately after the phototriac 90*a* turns on. The phototriac 90*a* remains turned on as long as the rectifier 24 supplies the power supply voltage to the phototriac 90*a*. The capacitor 25*a* discharges during the delay time through the closed contacts, phototriac 90*a*, resistor 90*b*, and energizing coil 90*c*. Thus, the voltage on the capacitor 25*a* applied to the VH terminal becomes lower than a reference voltage preset in the control IC 30. After the short delay time, the contacts of the relay 91 open. Once the contacts of the relay 91 become open, the succeeding stage of the relay 91 loses its power supply voltage and the FET 28*a* stops its switching operation. The voltage across the auxiliary winding 26*b* also becomes zero. In this manner, the power supply apparatus 20A enters an auto-off state. The phototriac 90*a* shown in FIG. 15 remains turned on even if the auto-off signal (AUTO-OFF-P) disappears. In order to bring the power supply apparatus 20B out of the auto-off state, the user must to bring the AC switch 21*a* to the off position, thereby turning off the phototriac 90*a*. When the AC switch 21*a* is switched off, the phototriac 90*a* turns off so that the contacts of the relay 91 are again closed. As a result, the voltage of the capacitor 25*a* applied to the VH terminal will increase, so that the power supply apparatus 20A will return from the auto-off state to the normal operating state.

The outline of the alarm signal process will be described below.

Once the alarm signal (ALM-P) is received, the light emitting device 41*f* emits light, causing the photo transistor 32*a* to turn on. The voltage rectified by the rectifier 24 remains applied to the VH terminal of the control IC 30 through the resistor 25*e*. The voltage on the VH terminal P8 is fed to the VCC terminal P6 via the internal circuit in the control IC 30, so that the control IC 30 normally operates.

Since the photo transistor 32*a* has turned on, the voltage on the ZCD terminal exceeds the latch threshold voltage to trigger the latch circuit in the control IC 30 and triggers the latch circuit. The latch circuit holds the latched state even if the alarm signal (ALM-P) disappears. The latched state lasts until the voltage on the VH terminal P8 decreases below the release threshold voltage set in the control IC 30.

If the user turns off the AC switch 21*a* after the latch circuit has been triggered, the voltage on the capacitor 25*a* will gradually decrease mainly through the resistors 25*b* and 25*c* in accordance with the time constant given by the capacitor 25*a* and resistors 25*b* and 25*c*. Once the voltage on the capacitor 25*a* decreases below the release threshold voltage set in the control IC 30, the latch circuit is released from the latched state so that the control IC becomes ready to drive the FET 28*a* to switch on and off again. If the user then turns back on the AC switch 21*a* again, the power supply apparatus 20B will return from the alarm state to the normal operating state.

When the +24 V output power increases in voltage above a certain voltage due to, for example, fluctuation in the input power, the same operation as the alarm signal process is performed to protect the power supply apparatus 20A.

Figure 16:
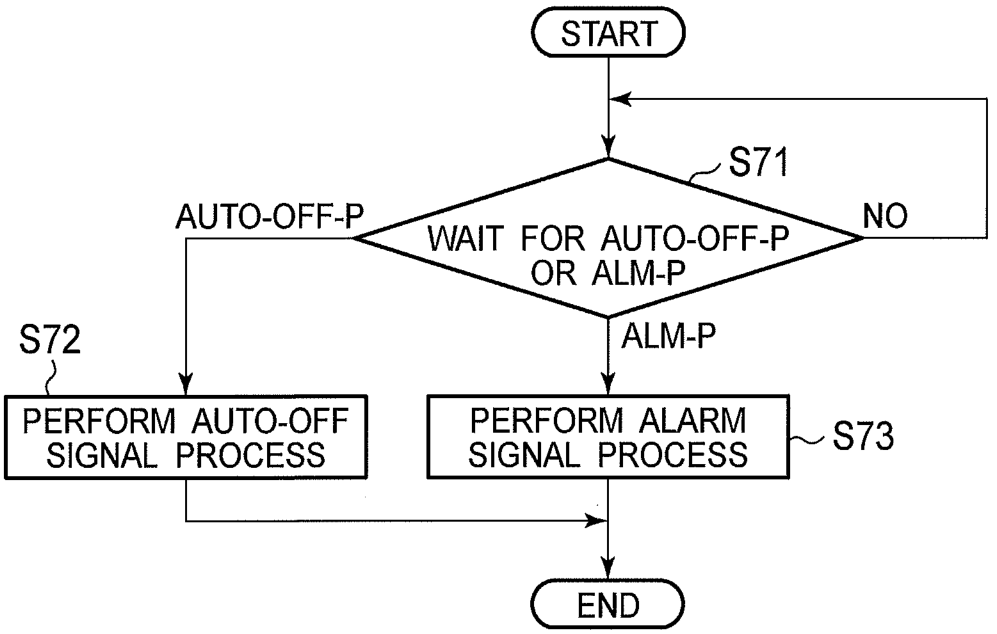
FIG. 16 is a flowchart illustrating the overall operation of the power supply apparatus shown in FIG. 14 and FIG. 15.

FIG. 16 is a flowchart illustrating the overall operation of the power supply apparatus 20B shown in FIG. 14 and FIG. 15.

The power supply apparatus 20B begins to operate.

S71: The power supply apparatus 20B waits for the auto-off signal AUTO-OFF-P or the alarm signal ALM-P. Just as in the power supply apparatus 20A of the first embodiment, the power supply apparatus 20B receives the AC power through the AC switch 21*a* and AC input section 22, and outputs regulated stable DC power from the DC power output section 38. The space motor driver 53 drives the space motor 14 (FIG. 1) and the print head driver 54 drives the print head 11*b* (FIG. 1), thereby printing on a sheet of print medium.

Upon reception of the auto-off signal AUTO-OFF-P from the arithmetic operation/signal processing section 52A of the controller 50A, the program proceeds to S72 where an auto-off signal process is performed and then the program ends. Alternatively, upon reception of the alarm signal ALM-P outputted from the driver alarm detector 55 of the controller 50A, the program proceeds to S73 where an alarm signal process is performed and then the program ends.

Figure 17:
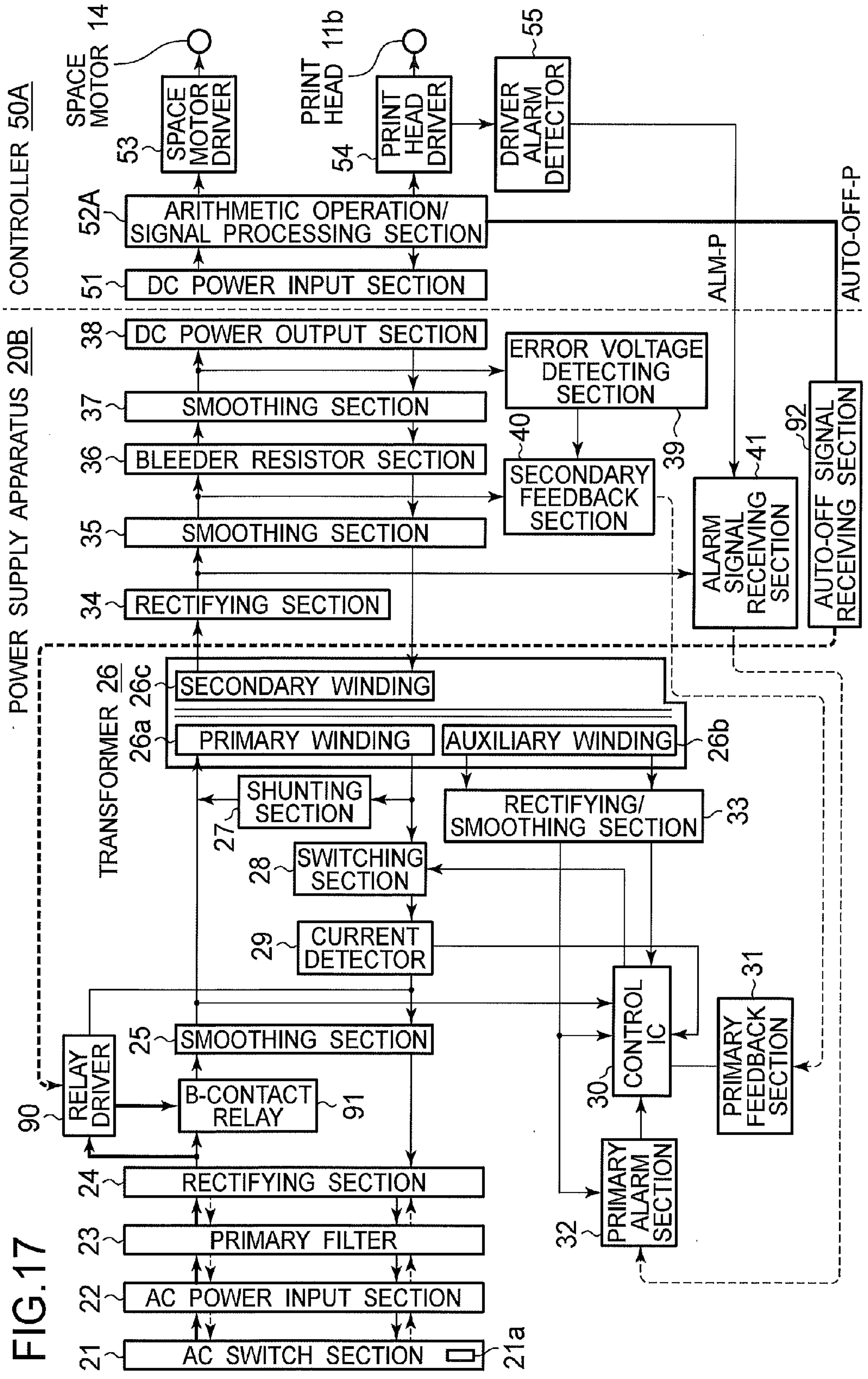
FIG. 17 is a block diagram illustrating the power supply apparatus shown in FIG. 14, illustrating the auto-off signal process in S73 shown in FIG. 16.

FIG. 17 is a block diagram illustrating the power supply apparatus 20B, illustrating the auto-off signal process in S73 (FIG. 16). FIG. 17 corresponds to FIG. 14.

The thick solid lines and thick dotted lines shown in FIG. 17 shows the flow of signals when the auto-off signal AUTO-OFF-P is generated and the power supply apparatus 20B is shut off automatically.

Figure 18:
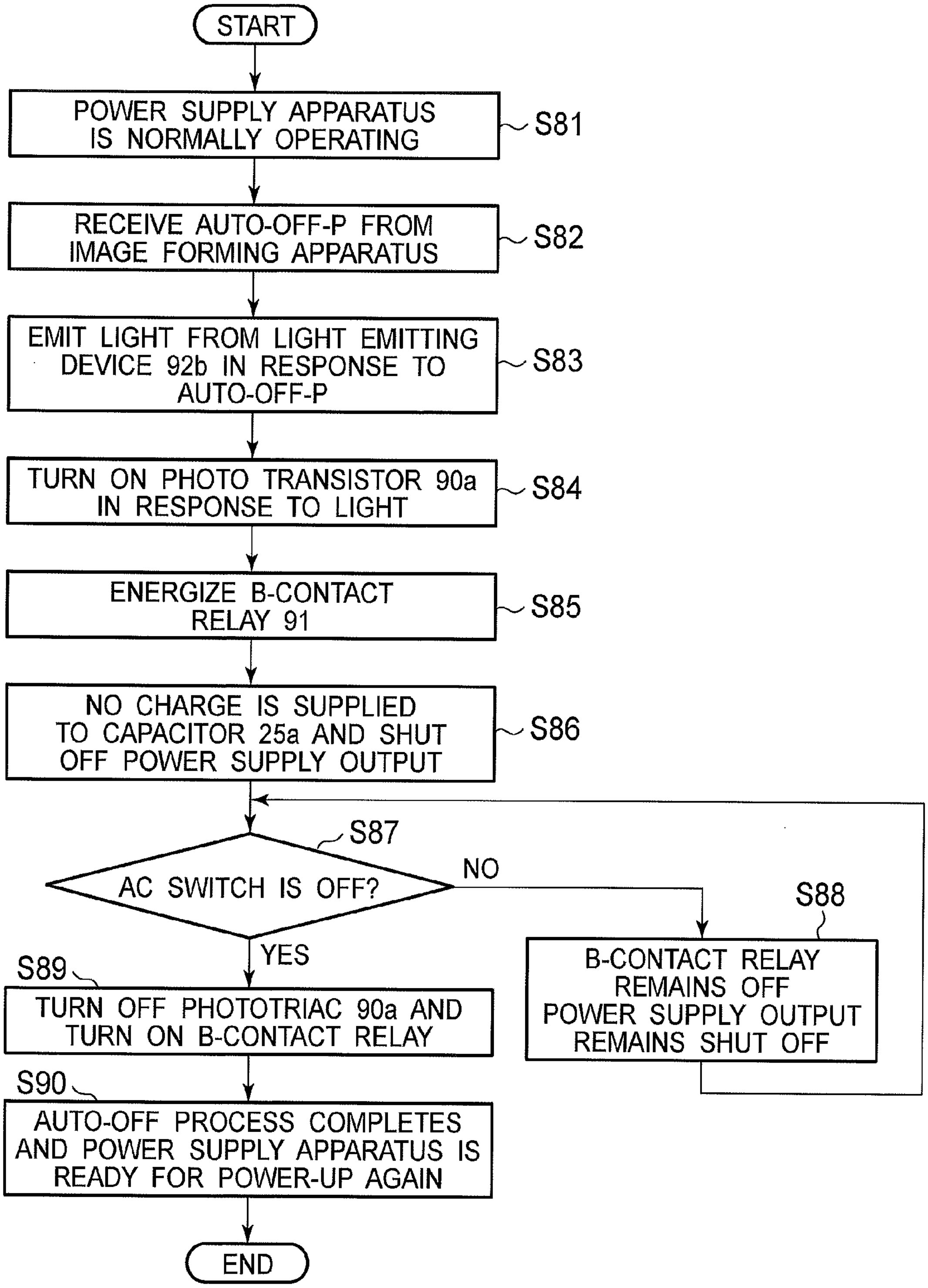
FIG. 18 is a flowchart illustrating the auto-off signal process.

FIG. 18 is a flowchart illustrating the auto-off signal process. The flowchart shown in FIG. 18 will be described with reference to FIGS. 15 and 17.

S81: The power supply apparatus 20B is normally operating.

S82: If the power supply apparatus 20B remains idle longer than a predetermined period of time, the arithmetic operation/signal processing section 52A sends the auto-off signal AUTO-OFF-P to the power supply apparatus 20B.

S83: Upon reception of the auto-off signal AUTO-OFF-P, the light emitting device 92*b*, which is a part of the phototriac coupler of the auto-off signal receiving section 92, emits light.

S84: In response to the light emitted from the light emitting device 92*b*, the photo transistor 32*a* turns on.

S85: Current flows in the energizing coil 90*c* and the energizing coil is energized, the contacts of the B-contact relay 91 open, thereby effectively disconnecting the rectifier 24 from the smoothing section 25.

S86: No charge is supplied to the electrolytic capacitor 25*a* so that the circuit on the secondary side of the transformer 26 of the power supply apparatus 20B is electrically disconnected. The program proceeds to S87.

S87: If the AC switch 21*a* of the AC switch section 21 is not in the OFF position (NO at S87), the program proceeds to S88.

S88: Current continues to flow through the phototriac 90*a* of the phototriac coupler to energize the energizing coil 90*c*. Thus, the contacts of the B-contact relay 91 remain open, so that no charge is supplied to the succeeding circuit elements through the B-contact relay 91. As a result, the output power of the power supply apparatus 20B remains shut off, and the program returns to S87.

S87: If the AC switch 21*a* is switched off (YES at S87), the program proceeds to S89.

S89: The AC switch 21$a$ is switched off, so that the charge in the capacitor 23$c$ in the primary side filter section 23 is discharged through the resistors 23$a$ and 23$b$ as a discharging resistor. Thus, the no current flows through the phototriac 90$a$, which is a part of the phototriac coupler, and the phototriac 90$a$ turns off. Since the energizing coil 90$c$ is not energized, the contacts of the B-contact relay 91 are closed, completing the operation so that the power supply apparatus 20B can be turned on again.

The other operations, e.g., when the alarm signal ALM-P is received, are the same as that of the first embodiment.

{Effects of Second Embodiment}

The auto-off signal AUTO-OFF-P is used for automatically turning off the power supply of the image forming apparatus 20B. The alarm signal ALM-P indicates the occurrence of an abnormality in the image forming apparatus which is the load on the power supply apparatus 20B. If the AUTO-OFF-P is received, the contacts of the B-relay 91 are made open and the relay driver 90 maintains the contacts open, thereby preventing the electric power rectified by the rectifier 24 from being supplied to the smoothing section 25. This leaves the output power on the secondary side of the transformer 26 effectively disconnected, allowing the power supply apparatus 20B to be turned on again promptly after the AC switch 21$a$ is switched off. In other words, the latching function of the control IC 30 remains inactive, allowing the power supply apparatus 20B to be turned on again immediately after the auto-off process.

Conversely, if the alarm signal ALM-P is received, just as in the comparative example and the first embodiment, a waiting time of several minutes can be ensured before the power supply apparatus 20B is turned on again after the AC switch 21$a$ is switched off, thereby ensuring the safe operation of the power supply apparatus 20B.

{Modification}

The present invention is not limited to the first and second embodiments and a variety of modifications may be made.

The configuration of the power supply apparatus 20A and 20B may be changed.

The print engine may be of the other configuration.

The image forming apparatus used in the present invention may be other types of printers such as copying machine, facsimile machine, and multi function peripheral (MFP).

The invention being thus described, it will be obvious that the same may be varied in many ways. Such variations are not to be regarded as a departure from the scope of the invention, and all such modifications as would be obvious to one skilled in the art are intended to be included within the scope of the following claims.

What is claimed is:

1. A power supply apparatus, comprising:

a power switch turned on to receive first power and turned off not to receive the first power;

a power converting section for converting the first power into second power, the power converting section being in one of a first operation state where the power converting section normally operates in accordance with a drive signal to produce the second power and a second operation state where the power converting section stops operating to produce the second power;

a controller configured to operate at least on an output power, the controller switching the power converting section between the first operation state and the second operation state, the controller outputting the drive signal to the power converting section in the first operation state, and not outputting the drive signal to the power converting section in the second operation state; and a latching section that drives the controller not to output the drive signal for one of a first period of time and a second period of time so that the power converting section is in the second operation state, the latching section driving the controller not to output the drive signal for the first period of time shortly after the power switch is turned off following reception of an alarm signal indicative of an abnormality of an external apparatus from the external apparatus, and the latching section driving the controller not to output the drive signal for the second period of time shortly after the power switch is turned off following reception of a power saving signal from the external apparatus, the first period of time being longer than the second period of time.

2. The power supply apparatus according to claim 1 further comprising a voltage supplying section configured to supply a power supply voltage to the controller; wherein if one of the alarm signal and the power saving signal is received, the controller enters the second operation state and the voltage supplying section supplies the power supply voltage to the controller.

3. The power supply apparatus according to claim 1, wherein the first power is alternating current power and the second power is direct current power;

wherein the power converting section further comprises:

a rectifying section that rectifies the first power into the second power; and wherein the latching section includes a capacitor that is charged by the second power, and the first period of time is determined by a voltage on the capacitor.

4. The power supply apparatus according to claim 3, wherein the latching section causes the capacitor to be charged by the second power when neither an alarm signal nor the power saving signal is received.

5. The power supply apparatus according to claim 4, wherein the latching section causes the capacitor to discharge through a discharging circuit in response to the alarm signal.

6. The power supply apparatus according to claim 5, wherein the controller outputs the drive signal only when the voltage on the capacitor decreases below a reference voltage.

7. The power supply apparatus according to claim 3, wherein the drive signal is a train of pulses;

and wherein the power converting section comprises a switching element that is driven by the train of pulses to switch on and off the direct current power.

8. The power supply apparatus according to claim 7, wherein the controller modulates the drive signal in pulse width for regulating an output of the power supply apparatus at a constant voltage.

9. An image forming apparatus incorporating the power supply apparatus according to claim 1, the image forming apparatus comprising an image forming section that forms an image on a recording medium.

10. The image forming apparatus according to claim 9, wherein the image forming section comprises:

a printing section; and an arithmetic operation processing section for driving the printing section; and a malfunction detecting section for outputting the alarm signal if the printing section malfunctions, and for outputting the power saving signal if the printing section is not performed longer than a period of time.

11. A power supply apparatus, comprising:

a power switch turned on to receive first power and turned off not to receive the first power;

a power producing section that produces second power from the first power;

a signal receiving section through which a first control signal and a second control signal are received from an external apparatus;

a controller configured to control supply of the first power to the power producing section upon reception of any one of the first control signal and the second control signal, the controller allowing the first power to be supplied to the power producing section when the power switch is turned on only a first period of time after turn-off of the power switch following reception of the first control signal, the controller allowing the first power to be supplied to the power producing section when the power switch is turned on only a second period of time after turn-off of the power switch following reception of the second control signal, the first period of time being different from the second period of time.

12. The power supply apparatus according to claim 11, wherein the first period of time is longer than the second period of time.

13. The power supply apparatus according to claim 11, wherein the first control signal is an alarm signal indicative of abnormality of the external apparatus and the second control signal commanding to place the power producing section in a power saving mode.

14. The power supply apparatus according to claim 11, wherein the power producing section does not output the second power during the first period of time and the second period of time.

15. The power supply apparatus according to claim 11, wherein the first period of time and the second period of time start shortly after the user turns off the power switch.

16. The power supply apparatus according to claim 15, wherein the controller comprises a capacitor that is charged by the second power and holds a voltage thereon before any one of the first control signal and the second control signal is received, the capacitor beginning to discharge through a first discharge path upon turn-off of the power switch following reception of the first control signal so that the first period of time is produced.

17. The power supply apparatus according to claim 16, wherein the first discharge path has a first resistance so that the first period of time is equal to a time required for the voltage on the capacitor to discharge through the first resistance to a value.

* * * * *